United States Patent [19]

McGrew, II

[11] Patent Number: 5,865,258
[45] Date of Patent: Feb. 2, 1999

[54] GOLF COURSE MAINTENANCE MACHINE

[76] Inventor: Jeff McGrew, II, 6770 Depot St., Sebastopol, Calif. 94472

[21] Appl. No.: 782,340
[22] Filed: Jan. 13, 1997
[51] Int. Cl.[6] .................................................. A01B 45/00
[52] U.S. Cl. ............................ 172/22; 175/161; 175/203
[58] Field of Search .............................. 37/348; 111/101, 111/102; 172/19, 20, 21, 22, 25, 111, 464; 175/548, 161, 203; 180/11, 49, 51, 52; 239/656, 661, 662

[56] References Cited

U.S. PATENT DOCUMENTS

| | | | |
|---|---|---|---|
| 2,881,844 | 4/1959 | Miller | 172/22 |
| 3,688,860 | 9/1972 | Molby | 180/79.2 |
| 3,995,569 | 12/1976 | Picardat | 172/598 X |
| 4,754,815 | 7/1988 | Brouwer et al. | 172/2 |
| 4,763,735 | 8/1988 | Gay | 172/22 X |
| 5,069,293 | 12/1991 | St. Romain | 172/22 |

Primary Examiner—Michael J. Carone
Assistant Examiner—Robert Pezzuto
Attorney, Agent, or Firm—George W. Wasson

[57] ABSTRACT

A mobile apparatus for golf course or other turf maintenance. The apparatus includes a vehicle with powered drive, steering mechanism, and maintenance equipment support structures. The vehicle may be a forward unit and a trailer unit with an articulated joint between the units; the forward or trailer units may have one or more wheels. The wheels are wide tires with smooth tread and low pressure. The maintenance equipment may be an apparatus for injecting a coagulant material into the subsurface of a turf area, an apparatus for cutting and placing a putting cup, an apparatus for grooming a hazard, rollers for rolling a turf surface, and other forms of turf maintenance equipment. The cup cutting and placement apparatus is designed to cut a plumb vertical hole in a putting green at the same depth with each operation, to remove a core from the subsurface, and to place a core in a previously cut hole.

36 Claims, 16 Drawing Sheets

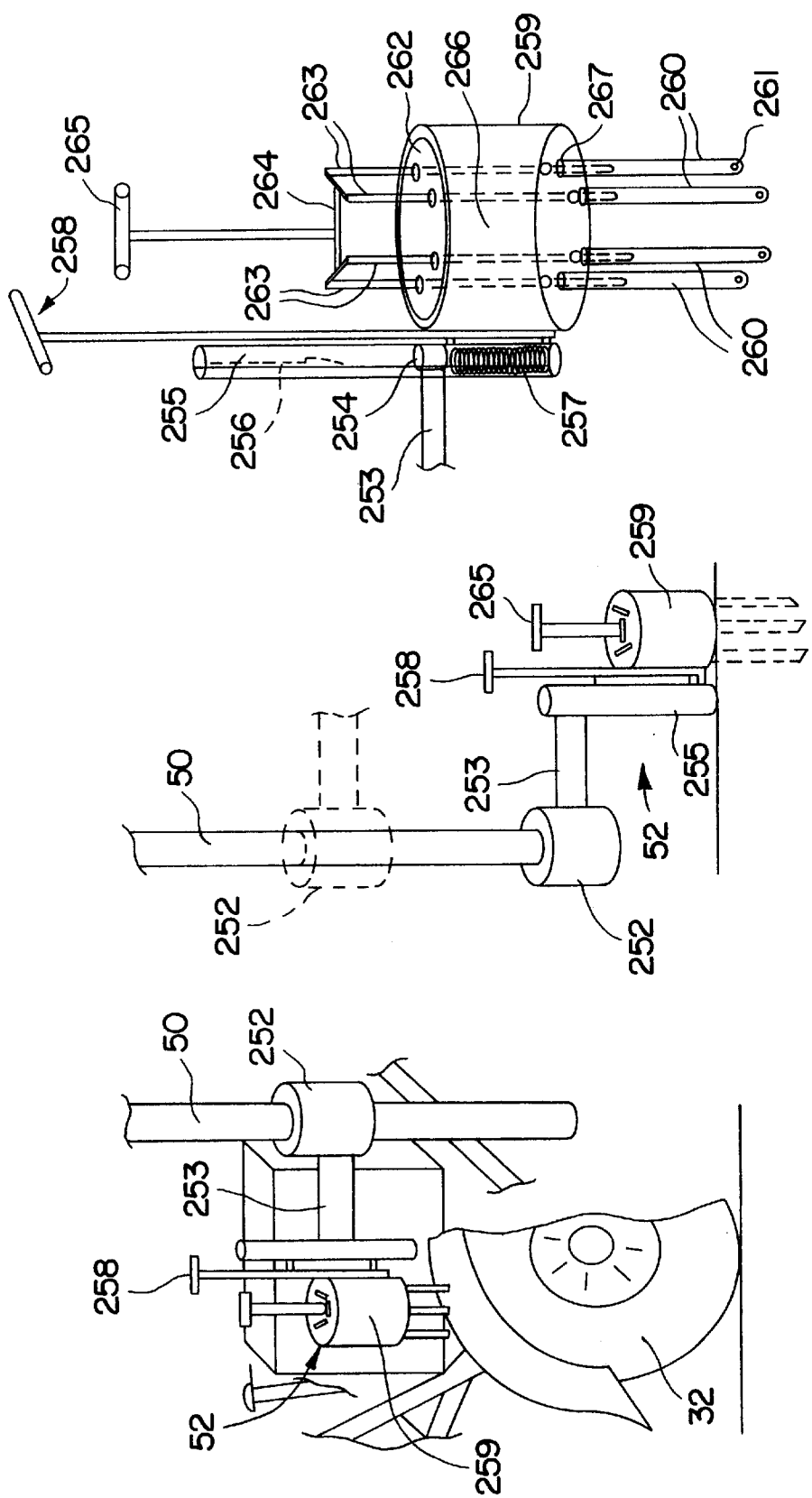

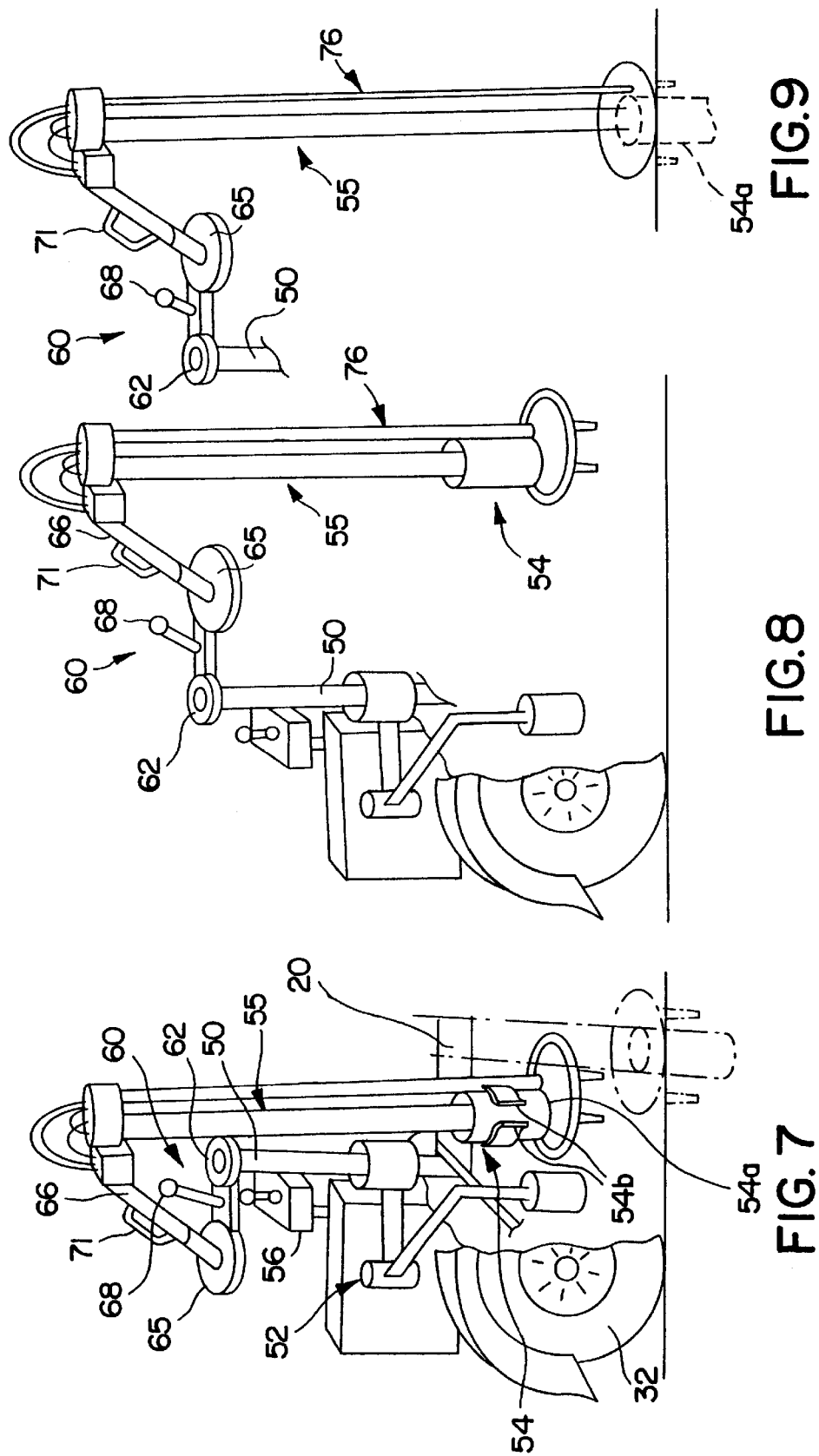

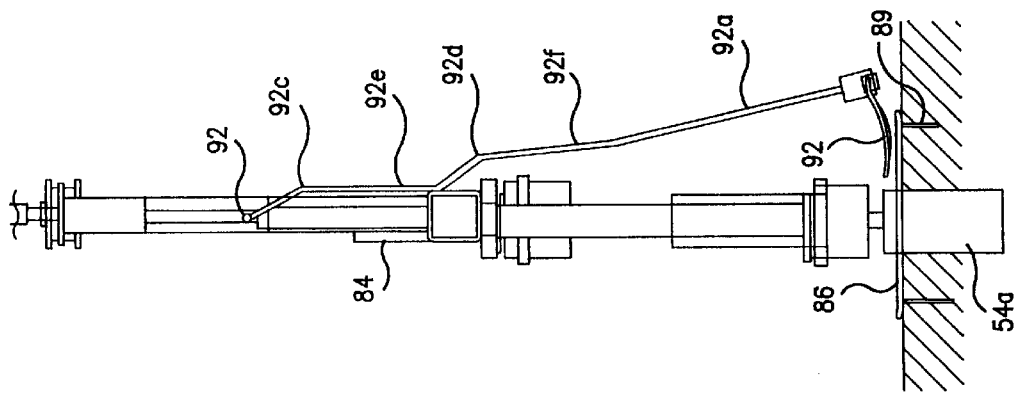
FIG. 11B
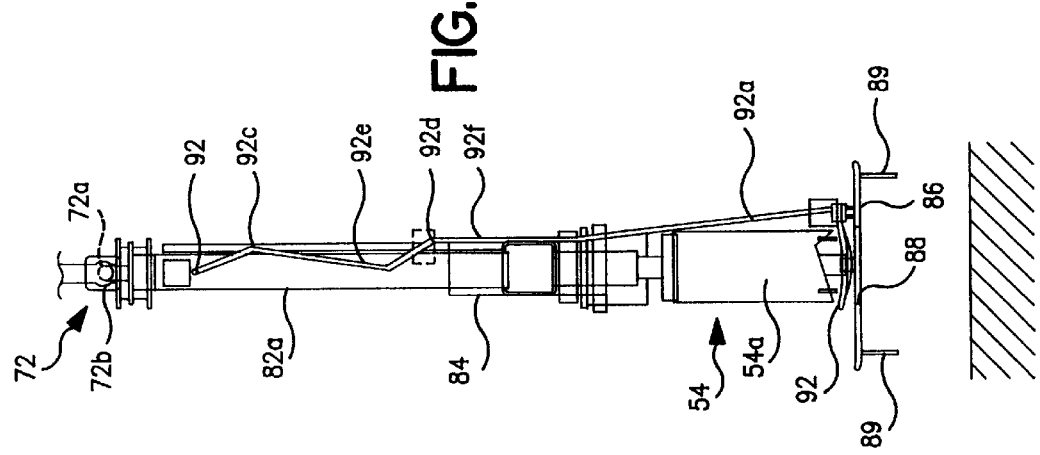
FIG. 11A
FIG. 10
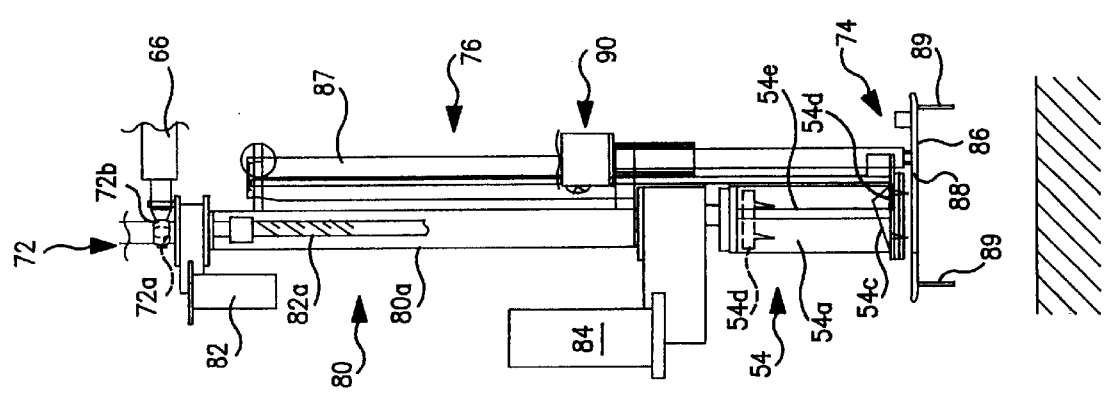

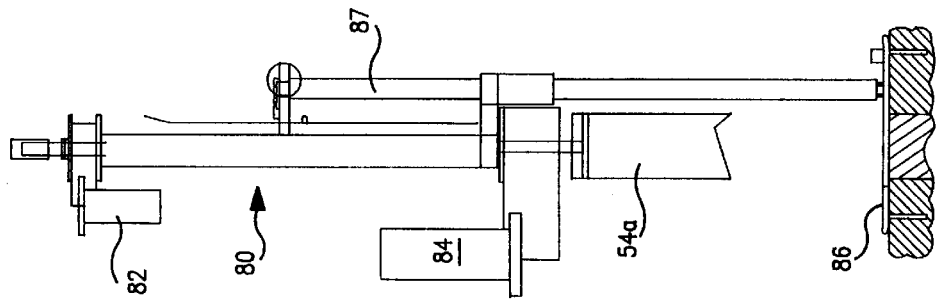
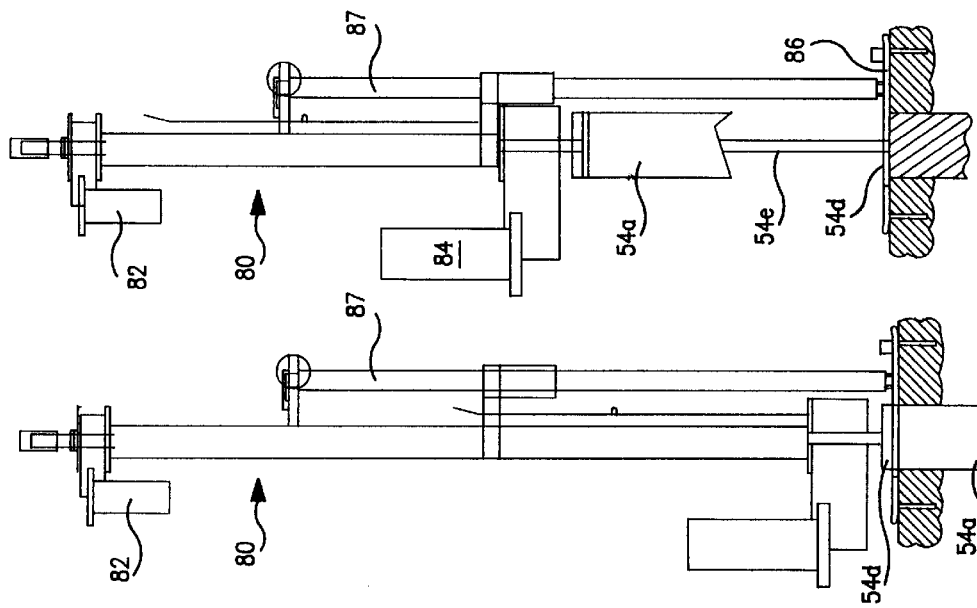
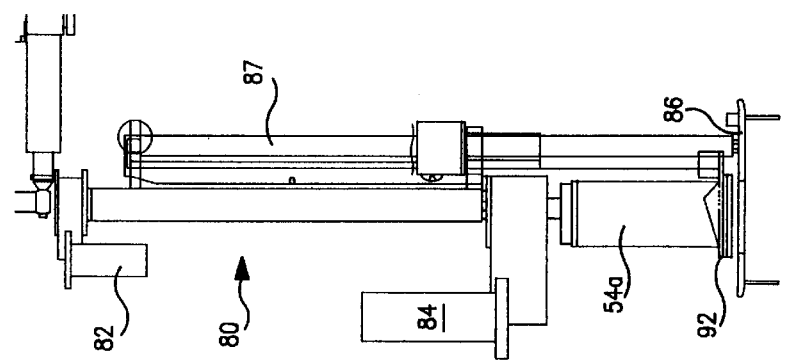

GOLF COURSE MAINTENANCE MACHINE

This invention relates to a golf course maintenance machine and more particularly to a machine for placing a putting cup, grooming a sand trap, cutting turf patches and other maintenance activities known around golf courses and frequently referred to as greenskeeping.

BACKGROUND OF THE INVENTION

The game of golf has been increasing in popularity for many years. Golf courses are being built throughout the world both as private clubs and as public facilities. The quality of course turf, greens and hazards have also increased as the players demand better and more attractive facilities. The increased play on the courses and the increased number of courses has placed in increased demand on the people and the equipment that are used to maintain the courses. The availability of skilled greenskeepers amd maintenance staff has placed a demand on the management of the courses for improved, more efficient and less labor intensive equipment for maintaining the courses. The present invention is directed to equipment for relieving that problem.

Golf is a game that is played to a set of rules; some of those rules apply to the construction of fairway, hazards and putting greens. One such set of rules is published in a booklet titles "THE RULES OF GOLF—as approved by THE UNITED STATES GOLF ASSOCIATION and THE ROYAL AND ANCIENT GOLF CLUB OF ST. ANDREWS, SCOTLAND" available from the USGA Order Department, P.O. Box 2000, Far Hills, N.J. 07931-2000. In those rules there are specific dimensions for putting cups and for the depth of placement of such putting cups. A hole as defined in the rules shall be 4¼ inches in diameter and at least 4 inches deep and if a lining is used, the lining shall be sunk at least 1 inch below the putting green. While not clearly stated in the rules, it is imperative that the putting cup be placed truly vertical in the putting green even though the putting green may slope with respect to the horizon. Hazards and particularly bunkers are defined in the rules; a bunker is defined as a hazard and as a prepared area of ground from which turf or soil has been removed and replaced with sand or the like. The players of the game, and particularly the tournament committees, have become more insistent on the quality of maintenance of the putting green, hazards and the course fairways. The placement of the cup on the putting green is moved regularly both to distribute the wear on the putting green and to change the line of putt to the hole from around the green. Hazards in the form of sand bunkers need raking and grooming to place them in the best condition for play.

The conventional way of placing and moving a putting cup on a putting green has been to use a hand powered cutting tool that takes a core from the putting green. In the usual procedure of moving a putting cup, the liner is removed from the hole that has been in use and then a new hole is hand cut taking a core from the new hole, that core is placed in the old hole and the liner that was in use is placed in the new hole. When cutting a new hole, it is the greenskeeper that attempts to keep all holes and therefore all cups the same vertical dimension. While there is no standard, the hole that is cut may vary from about 4 inches to about 8½ inches. The liner placed in the hole is, however, to be placed in accord with the rules with its top 1 inch from the turf surface. Because there is no uniformity in hand cut holes, there is sometimes a need to fill or remove soil from a cut hole to bring the replaced core to the level of the putting green.

The greenskeeper that cut the new hole is also responsible for attempting to keep the new hole in a vertical plumb axis and to maintain the putting green surface around the newly placed putting cup. It is important to the pleasure of the golf game that the putting green surface is not damaged in the placement of the putting cup and that the putting cup is always the same depth within the subsurface.

The conventional way of maintaining a sand bunker has been to rake the surface in preparation for a day's play. Powered equipment has been developed to rake and "fluff" the sand. None are known that are mounted on a combination greenskeeping machine and a trap maintenance machine.

Most golf courses include hazards along the turf areas and around the putting surfaces and those hazards usually include sand areas commonly known as sand traps. The perimeters of the sand traps are usually irregular and their surface contours are usually not flat. Frequently the sand traps are at a different elevation from that of the surrounding turf area whether that surface is a putting green or a fairway, and there is usually some contoured area between the edges of the trap and the turf area. While some hazards include hard or crusted surfaces, the usual sand trap includes a somewhat soft layer of sand that supports a golf ball but prevents it from rolling easily. Golfers using a golf course prefer a well maintained hazard and the courtesies of golf play requires that the surface of the hazard be returned to its original condition when a golfer has had to enter the hazard to advance a golf ball. The quality of a golf course is frequently measured in the quality of the maintenance of its turf areas and its hazards.

Maintenance of a sand trap hazard is a daily routine for the greenskeeping crew of a golf course. Use and off-hour maintenance of a golf course frequently leaves the sand traps in rough condition. Hand grooming of a said trap can be difficult and time consuming and may require a large crew of greenskeepers to keep all hazards in desirable condition. Mechanized equipment for grooming said traps and hazards are known, but none are known to the present inventor that are adapted to easily follow the contour and perimeter of a sand trap behind a mobile apparatus. The present invention is directed to a golf course groomer that can be transported between hazards and can enter the hazard to groom its surface in a quick and expeditious manner.

SUMMARY OF THE INVENTION

The present invention is designed to be mobile throughout a golf course so as to be self-propelled from storage shed to the several holes of a course for placement of putting cups and for maintenance of bunkers or fairways. The machine contains means for injecting a coagulant material into the subsurface of a golf course turf and the power source for placing a hole cutting apparatus on a vertical axis above a putting green in an alignment to permit the cutting of a truly vertical hole, the placement of the putting liner within the hole, the transport of the cut core to the previously used putting hole and the placement of the cut core into the previouly used hole. The invention includes means for assuring that the cutting of a core from the putting surface is always to the same depth and that the core is taken as a consolidated unit. Supported on the machine is a movable bunker or sand trap grooming assembly that can be moved to rake and smooth the sand surface within the bunker and the machine may be adapted with roller elements for use on a green or fairway of a golf course. The machine is supported on low pressure large wheels that distribute the weight of the machine over large square area surfaces of the putting green so that no damage is done to the surface as the machine is moved on the putting green.

The objects and features of the present invention will be readily apparent to those skilled in the art from the appended drawings and specification illustrating preferred embodiments wherein:

BRIEF DESCRIPTION OF THE DRAWINGS

FIG. 5 is a partial side elevation view showing the stored position of a coagulant injection apparatus.

FIG. 6a is a partial side elevation view showing coagulant injection apparatus units operation position.

FIG. 6b is an enlarged view of the coagulant injection elements.

FIG. 7 is a partial side elevation view showing the cup cutting apparatus in its stored position.

FIG. 8 is a side elevation view showing the cup cutting apparatus units position above a desired location for cutting a putting hole.

FIG. 9 is a side elevation view showing the cup cutting apparatus in its position engaging the surface of a putting green.

FIG. 10 is a side elevation view of the tower portion of the cup cutting apparatus.

FIG. 11a is a front end view of the tower portion of the cup cutting apparatus.

FIG. 11b is a front end view of the tower portion with the template in place and the cup cutter within the turf.

FIG. 12, 13, 14 and 15 are side views of the tower portion in the process of locating, cutting and core placement.

DETAILED DESCRIPTION OF THE INVENTION

Figure 1:
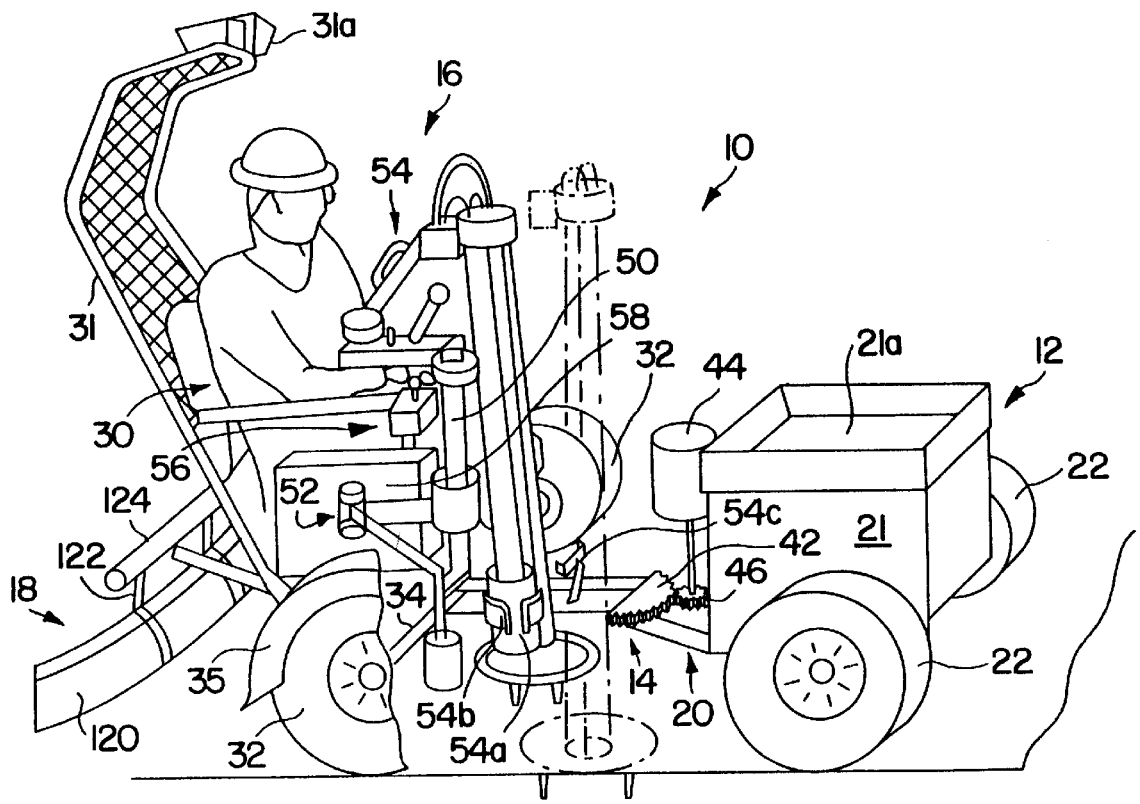
FIG. 1 is a perspective view of the assembled apparatus of a preferred embodiment of the present invention.

The present invention is a grooming apparatus for a golf course or the like having turf areas and hazards that require maintenance. The illustration of the apparatus as shown in FIG. 1 shows the assembed mobile apparatus 10 as including a forward unit or steering unit 12 with an articulated joint or coupling 14 connecting the forward unit to a trailer element or unit 16. In the form of the apparatus shown in FIG. 1 the steering unit 12 and the trailer unit 16 have two wheels, one at each side of the unit. It is possible to construct the grooming apparatus as a single unit without the articulated joint or two units as shown and one of the other of those units could have a single support wheel so that the apparatus would resemble a tricycle. The invention is not intended to be limited to the form shown in that many forms of a vehicle could serve the purpose of transporting the needed equipment to the maintenance functions that need to be performed.

In the form of FIG. 1 the forward and trailer units have individual rigid frames 20 which may be made of tubular materials to provide stength and light weight. The forward unit 12 includes a housing 21 for containing power sources (to be described hereinafter) and an upper storage bin 21a for carrying tools needed in the use of the apparatus. Additional storage means (not shown) for carrying longer handled tools may be attached to the tubular frame in places accessible to the operator of the apparatus.

The forward unit has wheels 22 attached to an axle 24 and a drive motor 26 is mounted within the housing 20 with a differential gear box permitting independent rotation of each wheel for turning movements. The trailer unit 16 has an operator support means 30 positioned generally above trailer wheels 32 supported on hubs on the axle 34 for independent rotation. If the trailer unit wheels are to be power driven, a differential gear (not shown) could be used to permit independent wheel rotation during turning movements. The operator support means is surrounded by an operator protection frame and screen 31 to protect the operator from flying or falling objects (such as golf balls) and a set of illuminating lights 31a are mounted to the frame to provide light, if needed, both in front and behind the mobile apparatus.

Figure 17A:
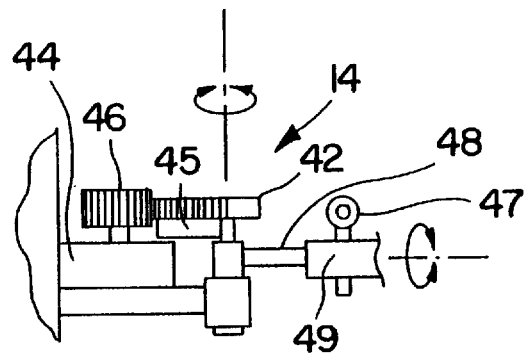
FIG. 17a and 17b are side and top views of the articulated joint between the front and trailer units of the apparatus.
Figure 17B:
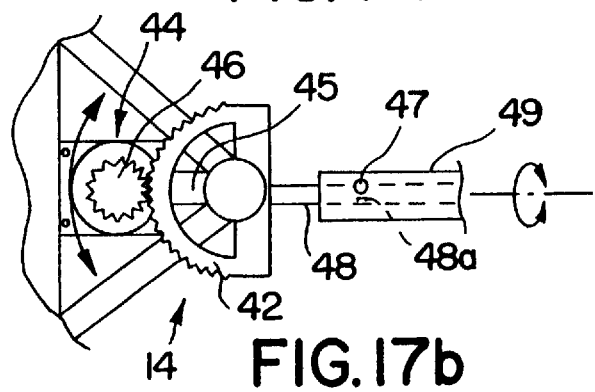
Figure 18:
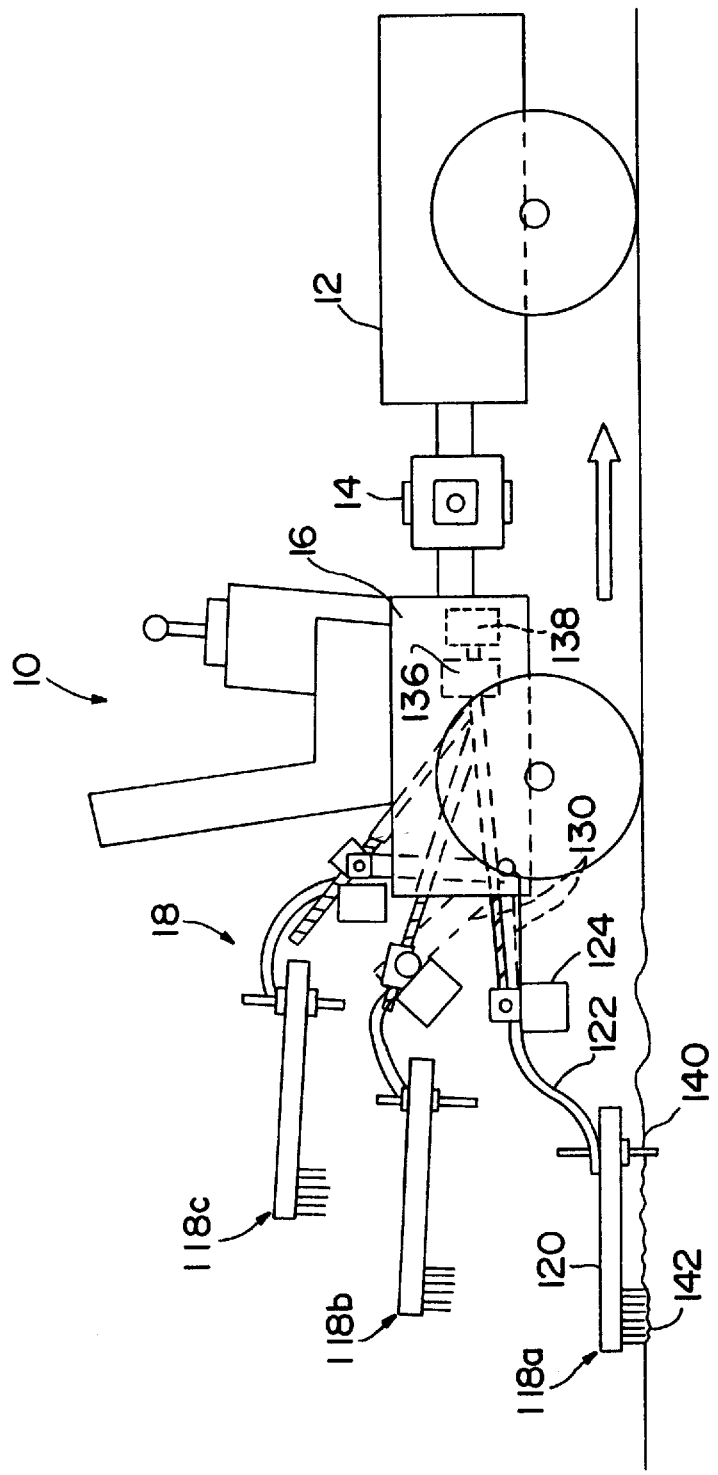
FIG. 18 is a side view illustrating the hazard maintenance apparatus.

The articulated joint 14 between the forward unit 12 and the trailer unit 16 is adapted to provide for relative movement between the forward and trailer units about a vertical axis generally through the articulated joint and for relative movement between the units about a horizontal axis through the joint, as shown in FIGS. 17a and 17b. The joint includes a sector gear 42 and a steering motor 44 for driving a drive gear 46 meshed with the teeth of the sector gear 42, The sector gear is fixed with respect to a tubular extension shaft 48 and the trailer unit is adapted with a hollow receiver 49 fixed to the trailer unit frame 20. The connection between the forward and trailer units requires some form of rotatable connection. In the form here illusteated, the shaft 48 includes an annular collar groove 48a to hold the forward and trailer units together while permitting rotational movement about the axis of the shaft 48, as shown by the rotary arrow in FIG. 17b. An alternative connection would include a collar on the shaft 48 to limit proximity to the trailer unit and a pin through the shaft at the trailer side to prohibit withdrawal of the shaft 48 from the receiver 49. The drive motor gear 46 and sector gear 42 connection provides for rotational movement about the vertical axis, as shown by the rotary arrow in FIG. 17a. Sensing means 45, to be described later, are included at the articulated joint 14 to control steering and alignment of the forward and trailer units.

Figure 27A:
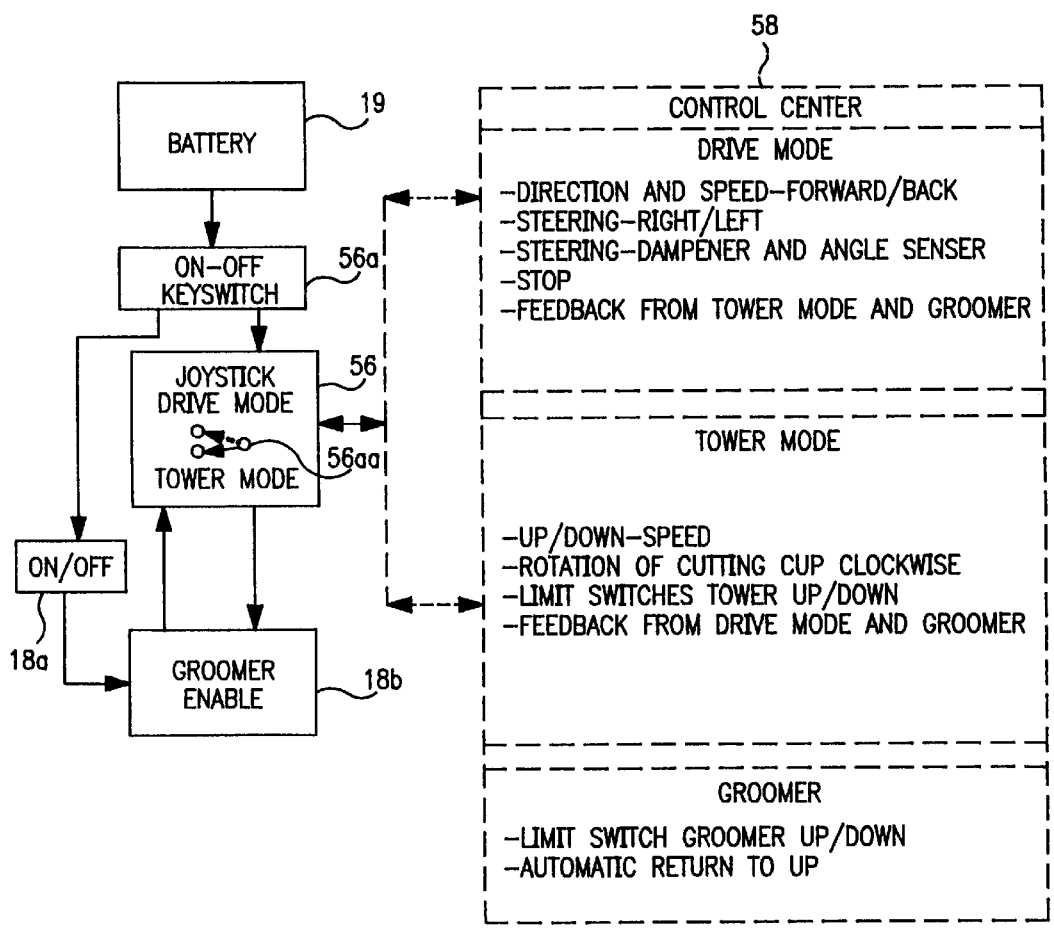
FIGS. 27a and 27b are schematic operating diagrams of the control system of the present invention.
Figure 27B:
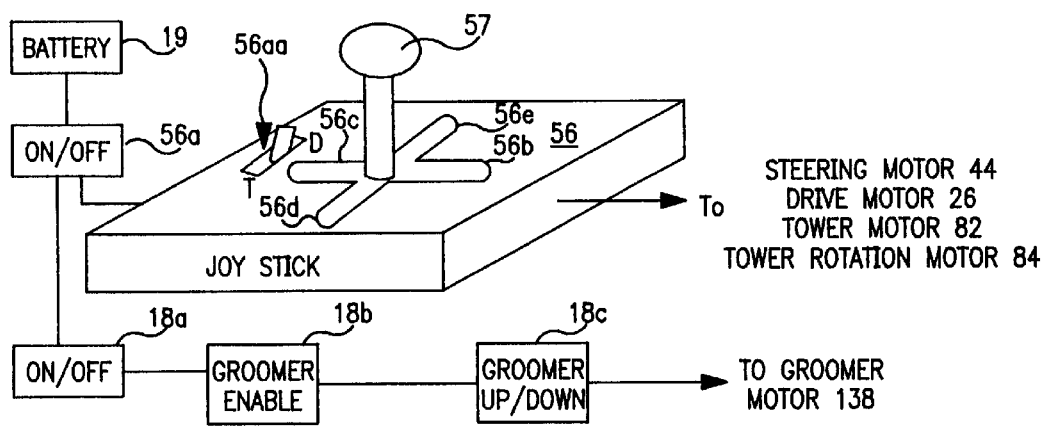

Supported on the trailer unit near its rear end is a hazard groomer assembly 18. Supported on the trailer unit near its mid-area is a maintenance equipment support post 50 for the support of a coagulant injection unit 52 and a cup cutter unit 54; other maintenance equipment, such as putting green rollers and damaged sod replacement cutters, may be supported on the post 50 in addition to those shown or as substitutes for those shown. The post unit 50 is adapted with releasable connections for the support of the maintenance equipment. In close proximity to the support post 50 is a manual control 56 and an ON/OFF key switch 56a for controlling motion of the mobile apparatus and for controlling operations of the maintenance equipment supported on the apparatus. That control, to be further described hereafter with reference to FIGS. 27a and 27b, is preferably in the form of a "joystick" shaft having a central "home" position and movement capability in forward/reverse and right/left directions to provide the desired control. A control center 58 is shown supported on the frame 20 of the trailer unit 16; this center includes the electrical and electronic controls for positioning, motion, sensing and limitations in operation of the elements of the mobile apparatus.

FIG. 1 illustrates the mobile apparatus 10 as including an articulated tow vehicle and a trailer unit; however, it should be understood that the mover of the apparatus is not restricted to the form shown, as any suitable adapted mover can be used that will be movable along and around a turf area or a hazard without doing damage to the surface of the area. The form herein shown is a preferred embodiment that accomplishes the desired movement without damage to the turf of the golf course.

Figure 2:
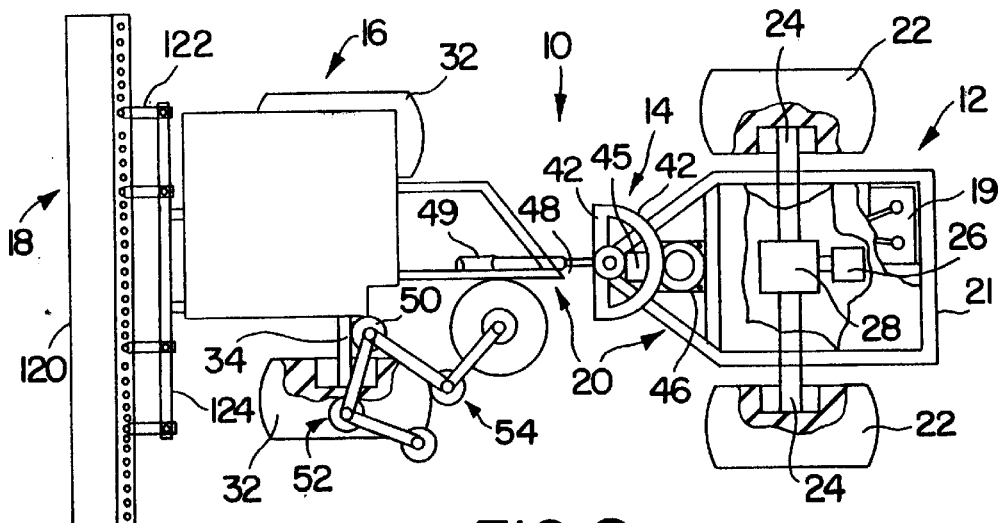
FIG. 2 is a top plan view of the chassis of the apparatus.
Figure 3:
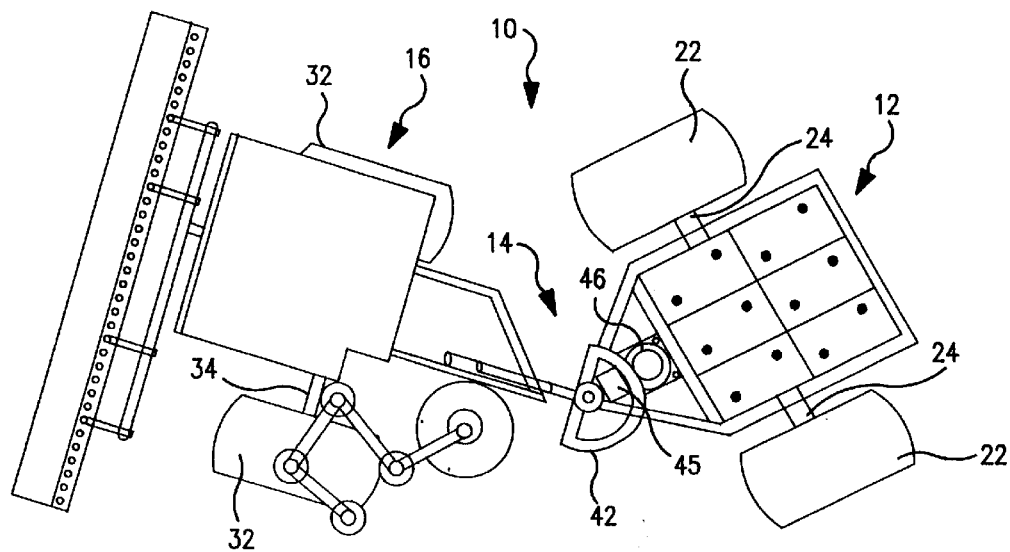
FIG. 3 is a top plan view showing the chassis in a left turn.
Figure 4:
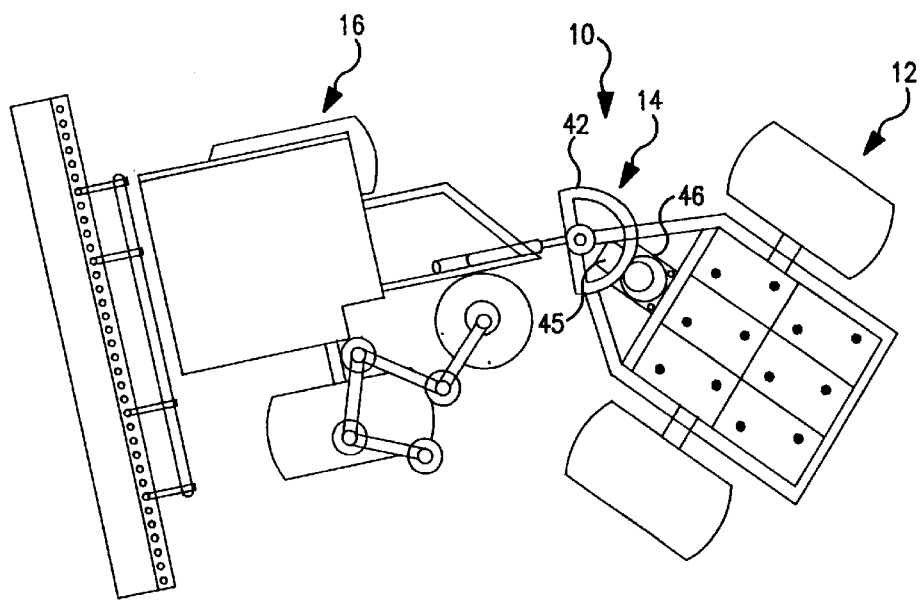
FIG. 4 is a top plan view showing the chassis in a right turn.

FIGS. 2, 3 and 4 are top plan views showing the space relationships between the forward unit 12 and the trailer unit 16. FIG. 2 illustrates the mobile apparatus 10 in a straight forward or reverse alignment. It should be noted that the tires 22 and 32 are relatively large diameter, broad in surface area and smooth tread. The total weight of the assembled mobile apparatus when distributed over the broad contact surface of the tires places weight per unit area (for instance per square inch) about the same as or less than the weight of the average male golfer's weight per square area on a golf course turf. The distribution of weight through the mobile apparatus places slightly more weight on the front wheels than on the rear wheels, somewhat dependent upon the weight of the operator and the maintenance equipment. The rear wheels are slightly narrower in wheel base so as to align the right rear wheel with a work area as will be described hereafter and to avoid having the two sets of wheels tracking in the same paths with a possibility of creating track marks on the golf course.

FIGS. 3 and 4 illustrate the mobile apparatus in left and right turns, respectively. As illustrated in FIG. 3, the drive gear 46 has moved counter clockwise around the sector gear 42 to move the axles 24 counter clockwise with respect to the trailer axles 34. It should be understood that the process of this relative movement, because of the use of a differential unit in the axles, has caused the forward unit left wheel 22 to move toward the trailer unit and the forward unit right wheel 22 to move away from the trailer unit. These movements have been in a rolling contact with the turf so as not to cause scuffing of the turf. In the same respect, the left and right rear wheels have also moved in a rolling manner so as not to damage the turf. If the wheels of the trailer unit were powered, the control circuits and differential would have permitted and controlled this relative movement of the wheels.

FIGS. 5, 6a and 6b illustrate a means for injecting a coagulant material into the subsurface of the golf course turf in an area to be maintained by the equipment of the present invention. Good drainage through the turf of a golf course, particularly on putting surfaces, requires tha the subsurface be permeable. Frequently the subsurface under the putting green is formed with a sandy loam that is friable; that is, it is likely to crumble when a core of the subsurface is extracted. It is important to good operations that the extracted core be extracted as a unit and that the unit be the same size with each extraction because the core is to be placed in another hole. To overcome that problem and to assist in withdrawing reasonably conglomerated cores, a preliminary injection of coagulating material may be made into the subsurface of the putting green. The apparatus of the present invention provides a mechanism for accomplishing that injection.

In the form shown in FIG. 6a the coagulant injection unit 52 is supported on the support post 50 independent of, adjacent to and below the supported cup cutting mechanism 54. The injection unit comprises a collar 252 rotatable about the post 50. An alternative support form could be a unit hinged on the support post 50. The injection unit can travel vertically on a rail or in a sleeve with spring loaded return to home position. In the form shown in FIG. 6b, extending from the collar is a pivot arm 253 terminating in a cylindrical shoulder 254. Surrounding the shoulder is an axially slotted cylinder 255 having a slot 256 wide enough to accomodate the pivot arm 253 while retaining the shoulder 254. Within the cylinder 255 a compression spring 257 (or a pull spring) is attached to the cylinder and the pivot arm collar 252 so as to bias the cylinder upwardly to the position shown in FIG. 6b; the spring 257 could be replaced by a motor driven screw drive mechanism for raising and lowering the unit. Attached to the exterior of the cylinder 255 is a vessel handle 258 that is adapted for manually lowering the slotted cylinder 255 along the pivot arm 253. Attached to the vessel handle 258 is a covered vessel 259 for containing and treating the coagulant material.

The vessel 259 has a plurality of hollow injection needles 260 attached to its bottom surface; the needles have injection outlet holes 261 at their ends and may have outlet holes along the needles if different distributions of the coagulant is desired. Extending into the vessel 259 through entry holes in its cover 262 are a like plurality of plungers 263 and the plungers are connected together at their tops with suitable bars 264 attached to a plunger handle 265. The handle 265 and bars 264 are adapted for manually pressing the plungers 263 through the vessel and the hollow needles 260 to force material from within the needles into the subsurface of the turf area.

The needles with the plungers 263 in place are forced into the subsurface of the turf and, when the coagulant material is ready for injection, the plungers are withdrawn to permit the coagulant material to flow into the needles; then the plungers 263 are pressed into the needles 260 to force the coagulant material into the subsurface of the turf. The coagulant material not only assists in solidifying the core that is to be extracted but also firms the face of the hole that is left after a core is extracted. With a firm face on the hole it is in better condition to receive a replacement core when filling the hole with a previously cut core. The needles 260 as illustrated in FIG. 6b are much larger than would be used in an actual installation; the needles should be sized so as not to damage the putting surface on entry or extraction while being large enough to place the coagulant material in the subsurface.

The vessel contains a coagulant material 266 that is fluid at some elevated temperature and coagulates at the ambient temperature of the subsurface. The vessel is further equipped with a heating element (either electrically operated or fuel fired) that is in contact with the coagulant material. When the material 266 is heated to a fluid state it is capable of flowing into the hollow needles through filling inlets 267 and is capable of being forced out of the needles outlets 261 as the plungers 263 are moved by the plunger handle 265.

After the coagulant material has been placed in the subsurface, the plungers are retrieved and the vessel handle is raised to return the vessel to its stored position along the cylinder 255 and the entire coagulant injection unit 52 may be returned to its stored position adjacent to the frame 20. The injected coagulant material will consolidate the subsurface sufficiently to permit core to be extracted and later placed as a substantially solid unit. The coagulant material is a biodegradable material, such as corn starch or gelatin, that does not permanently effect the golf course subsurface.

FIGS. 7, 8 and 9 are showings of the cup cutting elements of the present invention in the stored, extended and placed positions, respectively. The detailed portions of the cup cutting apparatus will be described later, these FIGs are provided to illustrate the deployment of the cup cutter tower. FIG. 7 illustrates the cup cutting apparatus in stored position on the trailer chassis. The cup cutting apparatus includes a cup cutter unit 54 with a cutter portion 54a. A clamping apparatus 54b is attached to the frame 20 of the trailer unit and a manually controllable release mechanism, for example foot pedal 54c supported on frame 20 of the trailer unit 16 with suitable connection to the clamping apparatus 54b, controls the operation of the clamping apparatus to secure the cutter unit 54 to the frame 20 when the mobile apparatus is being moved. When the clamping apparatus 54b is released, the cutter unit 54 is capable of being moved about the support post 50. The cutter unit 54 comprises elements that are rotatably supported on the support post 50 and a cutting tower pivot arm 60 provides for rotational movement of the pivot arm around the post 50.

Figure 16:
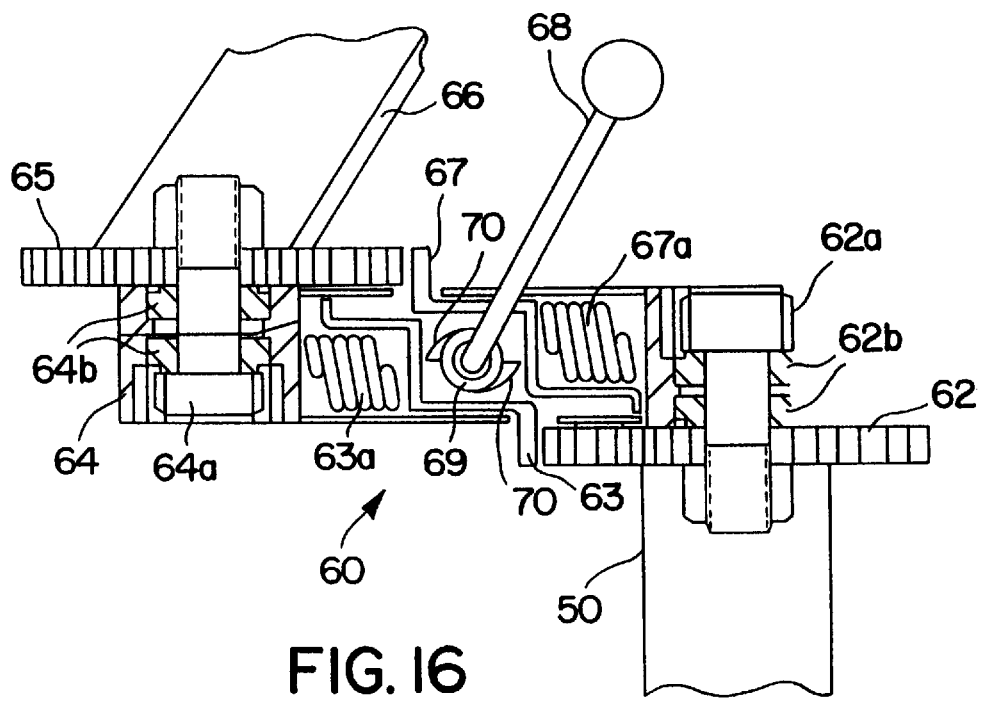
FIG. 16 is a side view, partially in section, of the adjustable locating mechanism for the tower portion on the chassis of the mobile apparatus.

Referring now to FIG. 16 showing the cutting tower pivot arm 60 partially in section, a fixed gear 62 is mounted on the post 50 by a suitable bolt and nut assembly 62a which also supports bearings 62b. A movable link arm 64 is supported on the bearings 62b at one end and supports a movable gear 65 at its other end on a bolt and nut assembly 64a including support bearings 64b. An upper arm 66 is attached to the gear 65 at one end and at its other end to the cutting tower 55 of the cup cutting unit 54. Within the movable link arm 64 are elements for placing and releasing locking pins for the movable link; those elements include a locking pin 63 with compression spring 63a for the fixed gear 62 and a locking pin 67 with compression spring 67a for the movable gear 65. A cam handle 68 outside of the movable link 64 is supported on a cam pivot 69 and includes cam shoulders 70 within the link 64 as operators for the locking pins 63 and 67.

When the cup cutter 54a is released from the clamps 54b, the cam handle is capable of releasing the cup cutting unit to its operating positions. In operation, the cam handle is moved about its pivot to cause the shoulders 70 to engage internal portions of the pins 63 and 67 to pull those pins out of engagement with the gap between teeth of the gears 62 and 65. When the pins are released from the gears the movable link arm is rotatable about the post 50 to carry the upper arm 66 to an alignment adjacent to the mobile apparatus and between the forward unit and the trailer unit, that position being shown in FIG. 8. The operator of the mobile apparatus moves the cam handle 68 to the pin release position and with another hand the operator can move the upper arm 66 by grasping the handle 71 attached to the upper arm 66. As will be further described hereinafter, the movement of the upper arm 66 is used to position the cup cutting tower at a location for cutting a cup or for placing a core within a previously cut hole.

FIG. 8 illustrates the position of the cup cutting tower 55 in position above the turf surface and away from the frame of the mobile unit. FIG. 9 illustrates the position of the cup cutting unit or tower 55 with parts of its elements in contact with the turf surface for either cutting a cup or placing a core in a previously cut hole. The previous FIGS. assembly drawings do not show the details of the cup cutting tower except as a generally supported assembly on the support post 50. FIGS. 10 through 15 are detail drawings, partially in section, showing the details of the cup cutting unit 54. The cup cutting unit 54 includes a universal support assembly 72 attaching the tower unit to the free end of the upper arm 66. The cutting unit has a template assembly 74 at the opposite end from the support assembly 72, a deployment mechanism 76 for the template assembly, a cup or hole cutting auger assembly 78, a deployment mechanism 80 for the cutting assembly, a motor 82 to raise and lower the deployment mechanism, and a motor 84 for rotating the cup cutting assembly.

The universal support assembly 72 is adapted to place the cup cutting assembly 55 in a truly vertical or plumb position with respect to the horizon of the golf course. As illustrated in FIGS. 10 and 11 the support assembly is preferably a ball and socket unit with the ball 72a on the tower assembly 55 and the socket 72b on the free end of the upper arm 66. Other forms of support for the cutting unit that would permit the cup cutting assembly to assume a vertical position (with respect to horizon) are contemplated in this support. As has been described previously, a putting green may have a complicated slope with respect to the horizon but the putting cup should be vertical to the horizon in spite of the slope of the green. With the cup cutting assembly 55 supported in the universal support assembly, the cup cutting assembly can be truly vertical and plumb.

For cup cutting or core placing operations, it is important to secure the vertical cup cutting assembly to the surface of the putting green. For that purpose, the template assembly 74 is supported on the cup cutting tower 55 in a manner to be lowered from the support assembly 72 along the vertical line of the cup cutting assembly 55 to place a template or platten 86 carried on a support rod 87. The template 86 is pivotally attached to the support rod 87 by a hard rubber hinge 87a to keep the template horizontal with respect to the tower assembly but flexible when contacting the turf. The template is preferably a clear plastic plate having a central hole 88 and pins 89 extending from its under surface. The support rod 87 is releasably locked in its raised position to the tower assembly by a latching means at 90 and, when released, the support rod and template 86 is dropped to contact the putting surface with the hole 88 vertically below the tower assembly 55 and the pins 89 in the putting surface to thus hold the tower assembly firmly secured to the putting surface at the operating end and firmly secured to the frame of the mobile assembly 10 by the universal support 72 on the upper arm 66. The deployed position of the template is shown in FIGS. 11b and 13–15.

Once the template is in place, the cup cutting unit 54 can be lowered to make contact with the putting surface. The cup cutting unit 54 includes a cylindrical cutter portion 54a having cutting teeth 54c at its lower end. Within the cylindrical portion 54a is a plunger 54d attached to a rod 54e. The plunger 54d is shown in its lowered position in solid lines and in dotted lines in its raised position in FIG. 10.

A movable cover plate or "crumb catcher" 92 for the cup cutting unit is supported on a support stick 92a hinged at 92b at the top on the deployment mechanism 80. The hinge 92b moves with the support rod 87 for the template so that, as the template is lowered into contact with the turf, the cover plate 92 is moved with respect to the cup cutting unit 54. The support stick 92a, as shown in FIG. 11, has a series of bends at 92c and 92d separating surfaces 92e and 92f, respectively. The surfaces of the support stick 92a engage the housing of the latching means 90 as the cup cutting mechanism deployment mechanism 80 is lowered and raised so that, as shown in FIG. 11, when the surface 92f is in contact with the housing 90, the cover plate 92 is below the cutting portion 54a to prevent droppings from the cutter from falling to the surface of the turf. When the mechanism 80 is lowered, the surface 92e is in contact with the housing 90 and the cover plate 92 is moved away from below the cutting portion 54a. As the deployment mechanism 80 is raised above the turf surface and the template 86 is raised, the cover plate 92 is returned to its position between the cutter teeth 54c and the template 86 to catch any crumbs that might fall from the cutter.

The cup cutting unit 54 is lowered from the tower assembly by the operation of the motor 82 supported on the upper arm 66. Motor 82 drives a threaded screw shaft 82a through a gear box 82b, the shaft 82a is supported from the gear box 82b and rotates within a hollow housing 80a of the deployment mechanism 80. A nut 82c fixed against rotary movement within the housing 80a is moved vertically within the shaft 80a by the rotation of the shaft 82a to raise and lower the internals of the tower assembly with respect to the upper arm 66. As the internals are lowered, the cup cutting unit 54 is lowered to cutting position within the template 86. A stop limit is provided within the deployment mechanism 80 within the gear box 82b or as a stop along the internals that limits the vertical movement of the shaft 82a so that every hole cut by the cutting unit 54 is always the same depth; the stop limit terminates energization of the motor 82 to stop the motor at the desired depth. With an exact depth of cutting (for example 8½ inches), any core removed from the turf will always fit within another hole cut by the cutting unit. Thus a core cut from one putting surface may be transported to another putting surface where a hole had been previously cut with the cutting unit of the present invention and that core will fit into the old hole to an exact depth with the top of the replaced core at the height of the putting surface.

The plunger 54d on rod 54e that slides within the cutter 54a is raised as the cutter is rotated and forced into the turf to the position shown in dotted lines in FIG. 10. When a core is extracted, the plunger remains in the raised position. When a core is placed in a previously cut hole, the cutting unit with the core and plunger are forced into the cut hole. To retain the core in the cut hole, a latch 54f is set within the deployment mechanism 80 to contact the top of the plunger rod 54e so that as the cutter 54a is raised the plunger is blocked and the core is retained within the cut hole. As the deployment mechanism is raised to its home position, the cover plate 92 is positioned below the cutter 54 and the template 86 is raised. The cutting tower may them be returned to a position clamped to the frame of the apparatus and the entire apparatus may be moved to a location where another putting cup is to be placed.

A preferred procedure for moving a putting cup on a putting green can be accomplished by lining the mobile apparatus up with an existing hole and the location where a new hole is to be placed. The flagstick and liner is then removed from the existing hole and the mobile apparatus is driven to a position where the cutting tower can aligned with the existing hole. The cutting tower is then released from its latch, moved above the hole and aligned in its plumb vertical position. The template is lowered and the cup cutting unit is lowered into the hole in the template and hole in the turf. The stop for the plunger rod 54e is placed and the cup cutting portion 54a is raised with the deployment mechanism. The cup cutting tower is relatched in its stored position and the mobile apparatus is moved to the location where a new hole is to be cut. In the moving process, the rear wheel of the mobile apparatus is rolled over the replaced core to smooth the surface of the putting green. The cutting tower is released, moved to its plumb vertical position, the template is lowered and cover plate moved; then the cutter deployment mechanism is operated to lower the cutter unit and rotate the cutter to cut a new core. The cutter unit is withdrawn from the turf with the core in place and the tower is returned to its latched position. The mobile apparatus is then moved and the liner and flagstick are placed in the newly cut hole. The apparatus may then be moved to the next operation with the core in place.

The foregoing is also shown in FIGS. 12–15 where FIG. 12 shows the cup cutter in initial deployment or in stored position with the cup cutter 54a withdrawn, with cover plate 92 below the cup cutter, and above the template 86 and the apparatus spaced from the turf. FIG. 13 shows the cup cutter 54a after it has entered the turf through the template 86. FIG. 13 shows the position pf the cup cutter 54a and the plunger 54d either when a new hole has been cut or when a core is placed in a previously cut hole. FIG. 14 shows the position of the cup cutter 54a, the plunger 54d and the template 86 when a core has been placed in a previously cut hole. In such an operation the cup cutter 54a is raised by the drive motor 82 while the plunger rod 54e has been latched within the deployment mechanism 80 and prevented from raising with the rotating mechanism. It should be noted that with the mechanism of the present invention the core is placed with its top surface in alignment with the turf surface because the core is always cut to the same depth. FIG. 15 illustates the core in place, the cup cutter 54a returned to its home position, the template 86 in contact with the turf prior to being returned to its stored position. The template 86 functions to hold the edges of a previously cut hole as a core is replaced thus insuring, as much as possible, a smooth transition between the existing turf and the newly placed core. Lowering the deployment mechanism 80 places latch 90 in contact with the top of the template support rod 87 and raising the deployment mechanism raises the template to its stored position of FIG. 12.

FIGS. 18–24 illustrate a hazard grooming apparatus 18 that may be supported on the trailer unit 16 of the present invention. When a hazard is to be groomed, the mobile apparatus 10 is adapted to enter the hazard and to lower the groomer elements into contact with the hazard surface. The mobile apparatus is then driven through and around the hazard to bring the groomer elements into contact with all surfaces of the hazard. The mobile apparatus 10 illustrated in FIG. 1 is supported on large, relatively soft and smooth tread tires that distribute the weight of the entire mobile apparatus evenly over the surfaces they contact. In a preferred form for grooming a hazard, the wheels of both units of the apparatus may be powered to make the apparatus more maneuverable through a hazard.

Figure 19:
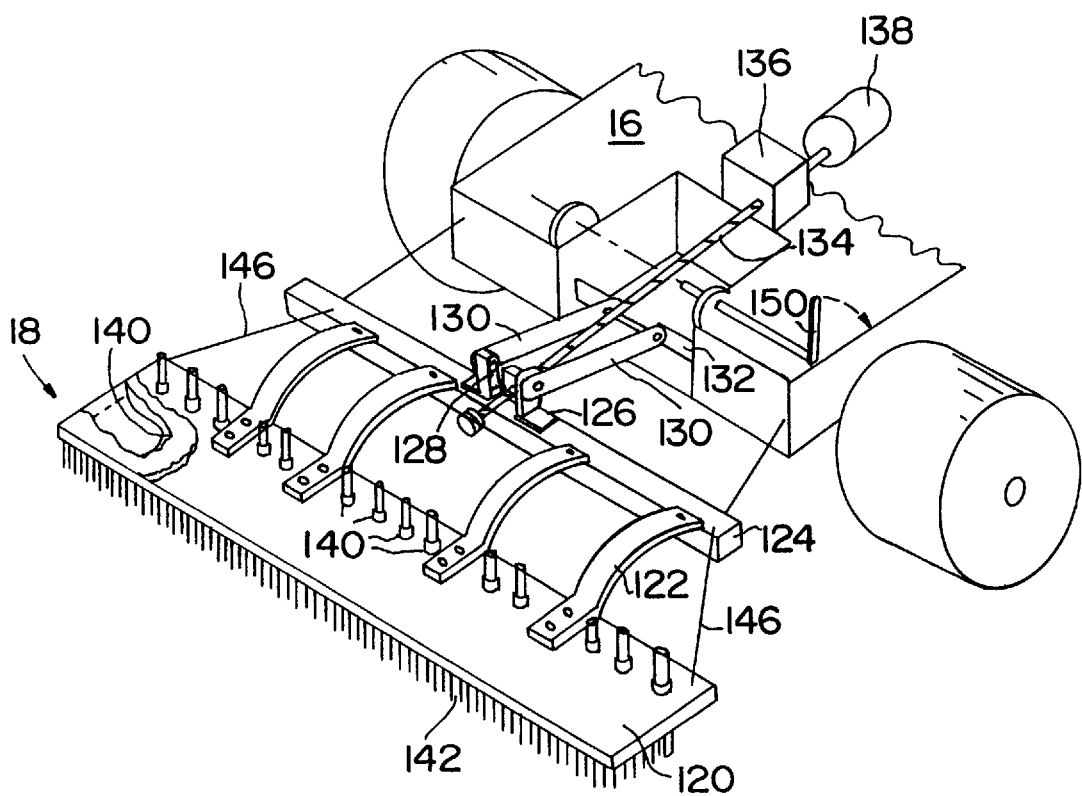
FIG. 19 is a perspective view of the hazard maintenance apparatus.
Figure 20:
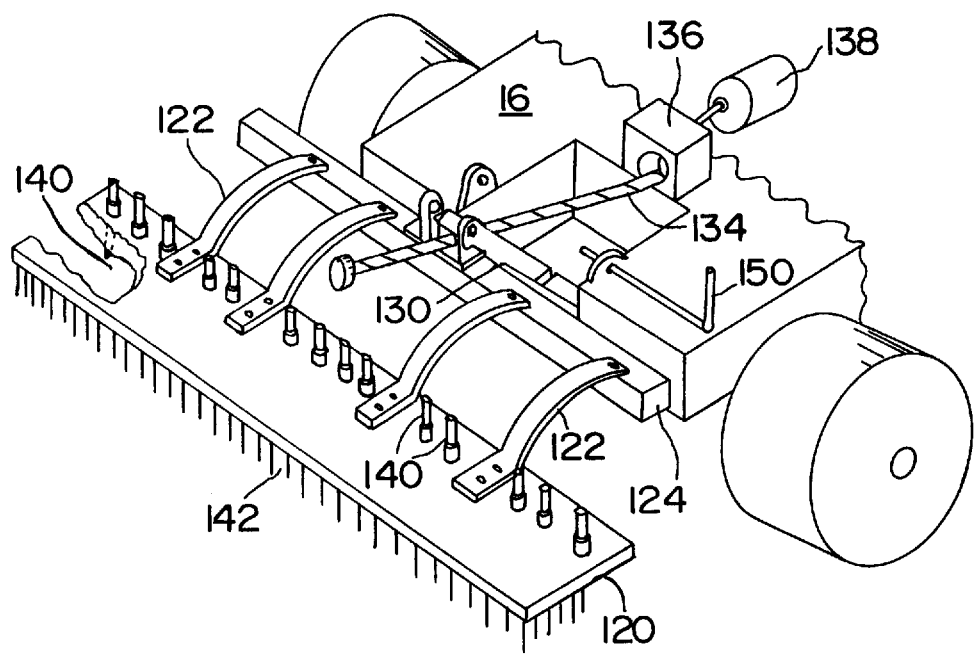
FIG. 20 is a perspective view of the hazard maintenance apparatus in stored position.

The trailer element 16 includes support elements for the grooming apparatus being transported with the trailer. As illustrated in FIGS. 18–24, such grooming apparatus includes a hazard groomer 18 shown in three positions: 118A in contact with a hazard surface, 118B raised from the hazard surface, and 118C in possible position for transport to another grooming operation. The groomer includes a flexible element 120 supported by flexible support straps 122 from a rigid support bar 124. Attached to the upper surface of the rigid support bar 124 are a pair of spaced support brackets 126 that pivotally support a threaded nut 128 between the brackets and a pair of support arms 130. The other ends of the support arms 130 are rotatably supported on a shaft 132 attached to the rear of the trailer element 16. A threaded shaft 134 is threaded into the nut 128 at one end and is rotatably driven from a gear box 136 including a universal joint and driven by a motor 138. Rotation of the threaded shaft 136 moves the nut 128 along the shaft and causes the support arms 130 to be rotated on their support shaft 132 to raise and lower the flexible element 120 with respect to the surface to be groomed and with respect to the trailer 16. The support arms 130 are slotted at 130a to permit the rigid support 124 for the flexible element 120 to float along the support arms 130 and thus permit the flexible element 120 to follow the contour of a hazard. FIG. 19 illustrates the groomer in contact with the surface and FIG. 20 illustrates the groomer raised from the surface with the nut 128 moved along the threaded shaft 134 and the support arms 130 rotated about the support shaft 132. The groomer could also be lifted and lowered by cable winch and/or several other means.

The flexible groomer element 120 as here illustrated includes a plurality of spikes or raking teeth 140 extending through the flexible element 120 and attached by adjustable couplings such as nuts or wedge connections. The spikes are adjustable to permit them to be positioned for depth control or to be lengthened due to wear. The spikes are intended to penetrate the hazard surface to a desired depth to disturb the top and interior surface of the hazard to bring it to a groomable condition. Also attached to the flexible element is a continuous broom element 142 that rides along the surface of the hazard and puts a final smooth surface on the hazard.

The flexible element 120 is supported by flexible straps 122 from a rigid support bar 124 and is preferrably formed of a continuous strip of flexible material such as a rubber or synthetic sheet having a reasonable thickness. The material is flexible in all directions so that it can follow the contour of a hazard and has sufficient weight to cause the surface of the hazard to be groomed as the element moves along the surface. The rigid support bar provides uniform pulling force to the flexible element 120 through the flexible support straps so that the flexible element can follow the contour of the hazard as the grooming is performed. It should be apparent that as the flexible element 120 is moved with the grooming apparatus in the direction of the arrow shown in FIG. 18, the spikes 140 penetrate the surface of the hazard to disturb that surface and the broom 142 smooths that disturbed surface to a finished groomed condition. The broom bristles of the groomer could be attached to or embedded in the flexible stip element 120 to perform the desired groomed finish.

Figure 24:
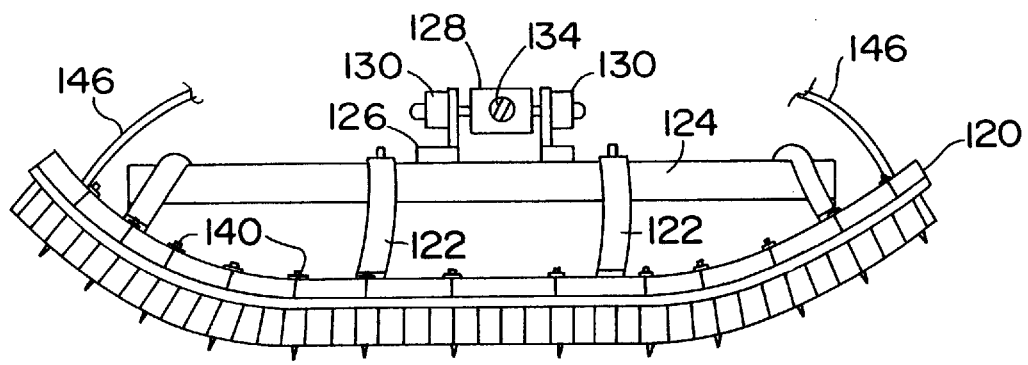
FIG. 24 is a rear view of the hazard maintenance apparatus in operation with a curved surface of a hazard.

The flexibility of the flexible element 120 is illustrated in FIG. 24 where the ends of the flexible element 120 can be raised by the contour of the hazard while the center remains in contact with the generally flat surface in the hazard. Raising and lowering the rigid bar 124 can be used to place the flexible grooming element into contact with a high face of a hazard from within the hazard. When the face has been groomed, the grooming element can then be repositioned to smooth the less sloping contour of the hazard.

Figure 21:
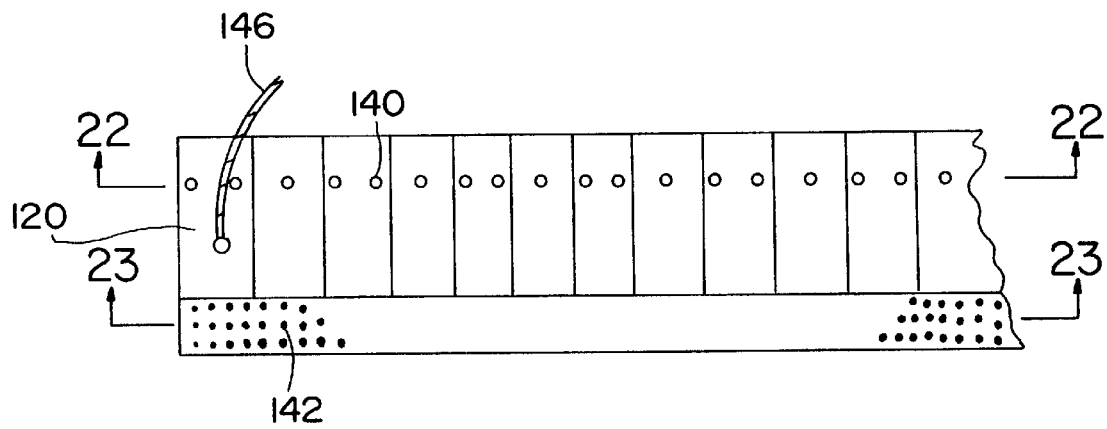
FIG. 21 is a partial top plan view of the groomer bar of the hazard maintenance apparatus.
Figure 22:
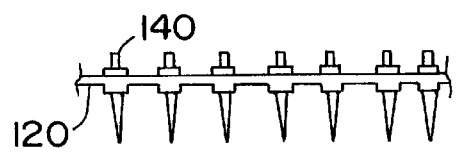
FIG. 22 is a partial sectional view taken along the lines 22—22 of FIG. 21.
Figure 23:
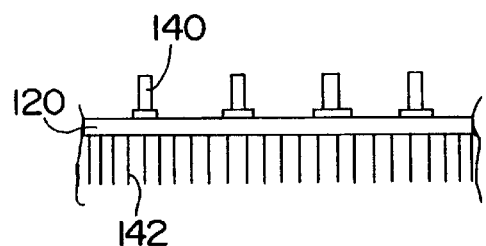
FIG. 23 is a partial sectional view taken along the lines 23—23 of FIG. 21.

Several additional features of the grooming element 120 and its flexibility are illustrated in FIGS. 21 and 24. At the outboard ends of the flexible element 120 a flexible cord or cable 146 is attached and the other end of that cord or cable is attached to the trailer 16 at 146 while the center of the cable passes through a connection at 148 at the outboard ends of the rigid support bar 124. The cable 146 is long enough to permit the outboard ends of the flexible element 120 to contact any portion of a hazard as the groomer is in contact with the surface of the hazard but when the rigid support bar is raised into transport position, the cable attachment to the trailer 16 causes the outboard ends of the flexible element 120 to be raised above the center portion so that there is not a possibility of the outboard ends being flexed down to a position that they might contact the surface of the course. Cable 146 will cause the groomer element outside ends to fold UP and DOWN when the flexible element 120 is lifted to its travel position.

Another interlock is provided at the trailer 16 for holding the support arms 130 in their raised position as the groomer is being transported. As here illustrated, a bar 150 can be positioned to prevent the support arms from being lowered. This interlock and bar placement can also be electrically integrated with the control of motor 138 so that the motor cannot be operated while the interlock is in place. With such an interlock in operation, it would be impossible to lower the hazard groomer onto a golf course surface accidentally and thus causing damage to a surface such as a putting green.

Figure 25:
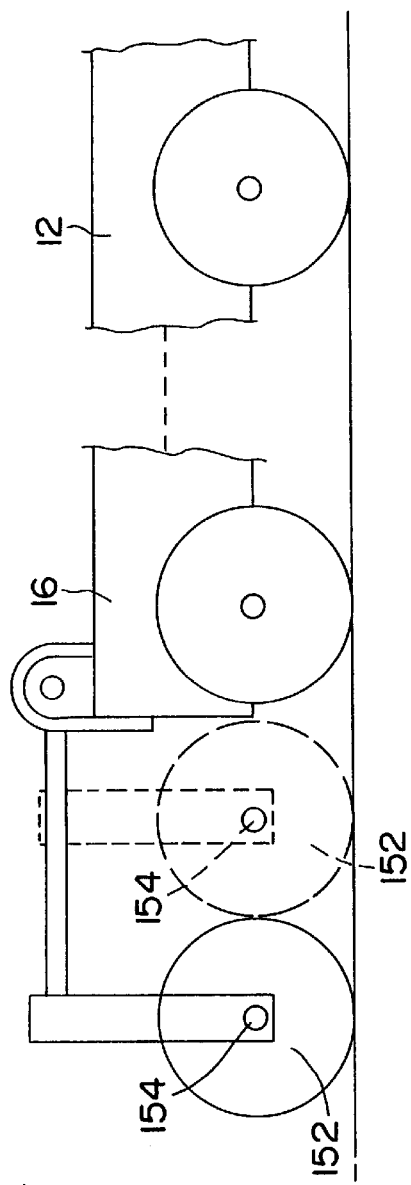
FIGS. 25 and 26 are side and rear views of additional attachments for the mobile golf course maintenance equipment.
Figure 26:
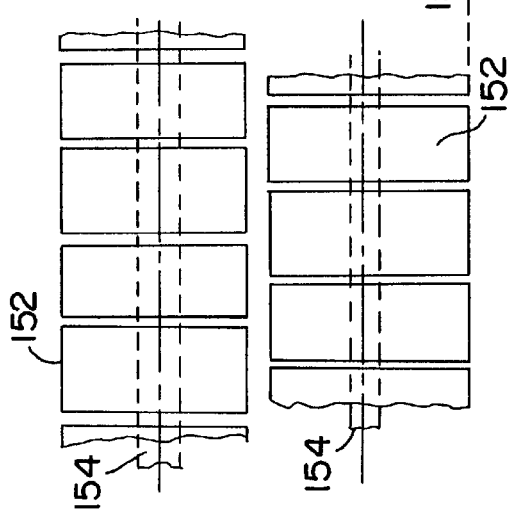

In addition to the hazard grooming capabilities of the apparatus illustrated, the present invention contemplates the use of the apparatus for the positioning of other grooming elements such as rollers as shown in FIGS. 25 and 26. The groundskeeping of a golf course is not only the mowing of the fairways and greens and the grooming of the hazards. There are occasions when the surface of a green or a fairway needs to be rolled to compact the surface or to remove an undesireable contour. The trailer 16 of the present invention and the raising and lowering apparatus, substantially as described, is capable of positioning rollers such as those illustrated at 152 in FIG. 25. The rollers can be one single roller or a plurality of smaller rollers as illustrated in FIG. 26 and can be on a plurality of parallel axles 154. The rollers can be hollow so as to be able to be filled with liquids or such material as sand to increase their weight. The apparatus for positioning the rollers can be controllable to permit the rollers to be weighted by the weight of the trailer 16. The coupling 14 between the steering element 12 and the trailer 16 will permit the trailer's weight to be transferred to the rollers; the steering element would continue to provide the drive, braking and steering for the unit.

While the apparatus here illustrated is capable of positioning the elements of the present invention in their operable positions, it should be understood that many alternative forms of apparatus could be used to position the hazard groomer or rollers in position. For example, the rollers as illustrated could be supported on the forward unit as well as on the trailer unit. One advantage of the apparatus of the present invention is that the single mobile apparatus is capable of carrying most if not all of the equipment needed to maintain the golf course on a single unit and the several functions can be performed by a single operator with the one unit. The present disclosure is not intended to be limited to the apparatus illustrated.

FIGS. 27a and 27b are schematic functional diagrams illustrating the electrical power control of the elements of the present invention. As illustrated, a battery source 19 is provided to power the several elements. In one form a 36-volt power may be provided by six 6 volt batteries connected in series; other voltages and source combinations are possible and contemplated with the present invention. The power is supplied to the motor 28 for the drive wheels of the forward unit 12 and the trailer unit 16 motor (if it is powered), for the steering motor 44, the motor 82 for raising and lowering the cup cutting elements, the motor 84 for rotating the cup cutter, and the motor 138 for raising and lowering the groomer elements. Control of these motors and other operations of the apparatus is controlled in the control center 58.

FIG. 27a illustrates in block diagram form the battery 19 connection through the ON/OFF (or key) switch 56a to the control for motion and operation 56 here shown as a joystick operator that has forward slot 56b, back slot 56c, right slot 56d and left slot 56e (as shown in FIG. 27b). The joystick is used in both motion operation of the mobile apparatus 10 (DRIVE MODE) and in the operation of the tower unit 55 (TOWER MODE); the selection of those modes being controlled by a selection switch 56aa in the joystick body. Switch 56aa is an interlocking switch that can be in either one of the two positions, but not both; thus insuring that the apparatus cannot be moved when the tower is deployed. The switch 56a also supplies power to the groomer unit 18 for positioning that unit. As illustrated in FIG. 27a, the signals from the joystick 56 are fed to and return signals are received from the control center 58 where the several functions of the present invention are controlled.

When the joystick 56 is in the drive mode, the control center controls the direction and speed of the wheel drive motor 26 by forward/back movement of the control arm 57 and steering of the apparatus by left/right movement of the control arm 57. In the control center, acceleration, angle and speed dampening signals are generated, based on the position of the control arm, the sensing means 45 in the articulated joint and feedback from the controlled elements, and those signals are used to control the energization of the respective motors. A STOP position is sensed and a feedback signal is returned to the joystick from the sensing means 45 in the articulated joint to insure that the joystick is in center position before new signals are fed to change direction or speed.

When the joystick is in the tower mode, the control center controls UP/DOWN operation and speed of the tower unit to place the cutting cup 54a in the turf or in storage position by forward/back movement of control arm 57 and clockwise rotation and speed of the cutting cup by left/right movement of the control arm 57. The cup cutter is rotated only in the clockwise direction regardless of the right/left movement of the control arm. In the tower unit there are signals generated that are fed to the control center that indicate limit positions of UP/DOWN to insure that a cup cutting operation has reached the desired limit or position and feedback signals are returned to the control center to insure that the elements of the tower unit are in the correct position before a different operation is initiated.

When groomer ON/OFF switch 18a is ON the control center controls operations of the groomer 18 in enabling position and in lowering and raising the groomer elements. Enabling of the groomer 18 by enable switch 18b identifies when the groomer elements are released from a stored position and are in position to be lowered into contact with a hazard surface. Feedback to the joystick 56 from the control center 58 prevents the joystick from controlling motion of the apparatus or operation of the tower when the groomer is being operated or is in enable position. The groomer 18 is energized through the ON/OFF switch 18a to the enable switch 18b and a groomer position switch 18c for lowering the groomer. When the groomer position switch is released, the groomer returns to the raised position and resets the enable switch 18b. Before the groomer can be lowered again, the enable switch 18b must be operated and switch 18c operated to lower the groomer. A signal is fed to the contol center 58 to insure that the groomer is in position for operation or storage.

The foregoing elements provide the following controls:
ON/OFF switch—Provides on/off operation for the main power.
Joystick—Provides direction and speed control when the apparatus is in drive mode and provides up/down speed and cup rotation control for the cutting tower when the apparatus is in tower mode.
Angle Sensor—Indicates the angle and direction from "straight ahead" at the articulated joint for the apparatus turning control.
Speed Sensor—Indicates the apparatus speed to allow the amount of steering dampening.
Groomer Enable—The groomer enable switch must be operated as a safety device to allow the lowering of the sand trap groomer when indicated by the closing of the groomer switch.
Groomer Switch—Keys the groomer operation to lower the sand trap groomer, after the Groomer Enable has been operated. Releasing the Groomer Switch will cause the sand trap groomer to immediately move to the UP position and resets the Groomer Enable.
Light Switch—ON/OFF control for operator work and driving lights.
Motion Switch—Enables either Drive or Tower mode.
  Drive Mode—Allows apparatus motion based on joystick controls.
  Tower Mode—Allows cup cutter motion based on joystick controls.
Limit Switches—Stops direction movement of groomer or tower.
  Tower Home—Tower is in the upper limit for apparatus motion.
  Tower Down—Cup cutter has reached the proper cutting depth.
  Groomer Up—Groomer is in the UP position.
  Groomer Down—Groomer is in the DOWN position.

BASIC OPERATOR ACTIONS
DRIVING THE APPARATUS:
The following sequence of events occur during drive operations and the following must occur before the joystick is enabled for operation:
 1. ON/OFF key switch must be ON.
 2. Tower Home position must be sensed.
 3. Drive Mode must be sensed.
 4. Using joystick, operate the apparatus in forward/backward and left/right steering motions.
   Joystick Forward—Forward motion of joystick, from the center position, will cause forward motion and acceleration to the speed indicated. Backward motion from a forward position will cause the apparatus to decelerate. Full backward motion past the center position, will cause the apparatus to decelerate to a stop position and then begin backward motion and acceleration to the speed indicated.
   Joystick Backward—Backward motion of joystick, from the center position will cause backward motion and acceleration to the speed indicated. Forward motion from a backward position will cause the vehicle to decelerate. Full forward motion past the center position, will cause the apparatus to decelerate to a stop position and then begin forward motion and acceleration to the speed indicated.

Joystick Left—This motion coupled with a forward or backward motion signal will cause steering to the left.

The turn angle will continue until the angle sensor indicates that the apparatus is in the desired turning radius. The vehicle maintains that turning radius until the operator moves the joystick to signal reducing or increasing the angle of the turn. Similarly, the turning logic monitors vehicle speed and inhibits tight turns at higher speed.

Joystick Right—This motion coupled with a forward or backward motion signal will cause steering to the right. The turn angle will continue until the angle sensor indicates that the apparatus is in the desired turning radius. The vehicle maintains that turning radius until the operator moves the joystick to signal reducing or increasing the angle of the turn. Similarly, the turning logic monitors apparatus speed and inhibits tight turns at higher speeds.

CUP CUTTING OPERATION:

The following sequence of events occur during cup cutting operation and the following must occur before the joystick is enabled for cup cutting.

1. ON/OFF key switch must be ON.
2. Apparatus motion must be stopped or at zero speed.
3. Tower Mode must be sensed.
4. Using the joystick, operate the apparatus in UP/DOWN and rotate motions.

Joystick Forward—Forward motion of joystick, from the center position, will cause downward motion of the tower and acceleration to the speed indicated. The motion will continue until the limit switch operates stopping downward motion. Backward motion from a forward position will cause the tower descent to decelerate.

Joystick Backward—Backward motion of joystick, from the center position, will cause upward motion of the tower and acceleration to the speed indicated. The motion will continue until the Tower Home switch operates or the operator returns the joystick to the neutral position stopping downward motion.

Joystick Right/Left—Right or left operation of the joystick causes the cup cutter to rotate at a constant speed in clockwise motion.

SAND TRAP GROOMING

The following sequence of events occur during grooming operations and the following must occur before grooming begins:

1. ON/OFF dey switch must be ON.
2. Tower Home position must be sensed.
3. Drive Mode must be selected.
4. Groomer Enable must be selected.
5. Groomer must be lowered.
6. Using Joystick, operate the apparatus to move and steer the apparatus.

Release of the groomer lowering switch causes the groomer to return to a raised position and the Groomer Enable switch must be operated again to lower the groomer after each return to raised position.

The sensing means 45 in the articulated joint 14 referred to in the description of the articulated joint (FIG. 17a and 17b) and the control of the DRIVE MODE comprises a pair of magnetic sensors; one fixed to the sector gear 42 and the other fixed to the housing of the drive gear 46. These magnetic sensors have magnetic elements that are aligned in a home position and generate a signal whenever they are misaligned from the home position. When the forward and trailer units are aligned in a forward or reverse straight alignment there is no signal from the magnetic sensors. When the forward and trailer units are misaligned, as in a turn, a signal from the magnetic sensors proportional to the misalignment of the units is fed to the control center to identify that condition. When the joystick is returned to center, the sensed signals from the magnetic sensors initiates energizstion of the steering motor 44 to return the units to an aligned position. In that manner the forward and trailer units are always in straight forward/reverse alignment when the joystick is released and when the switch 56aa is in the drive mode position.

Figure 28:
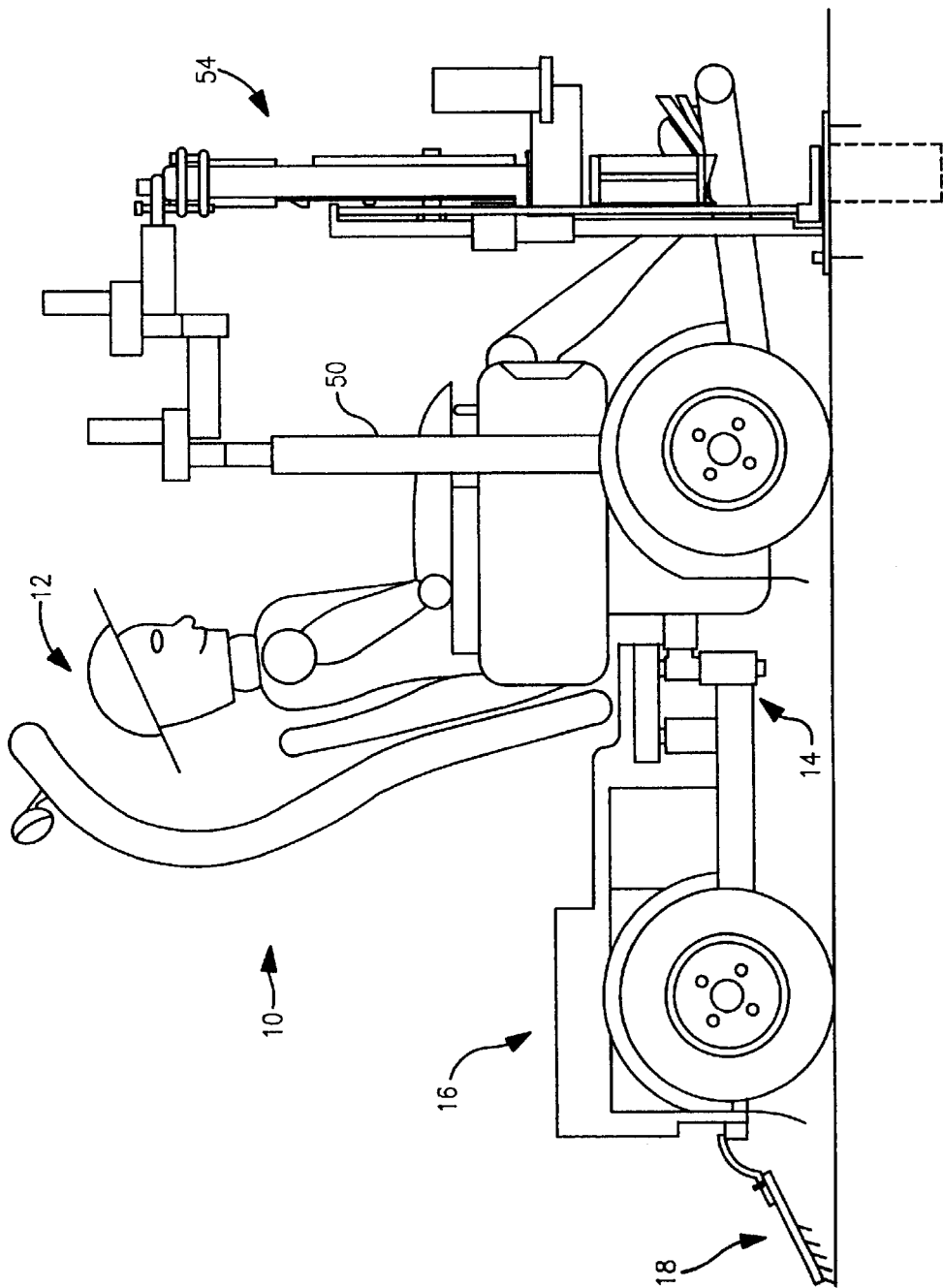
FIGS. 28 and 29 show an alternative form of the mobile golf course maintenance apparatus of the present invention.
Figure 29:
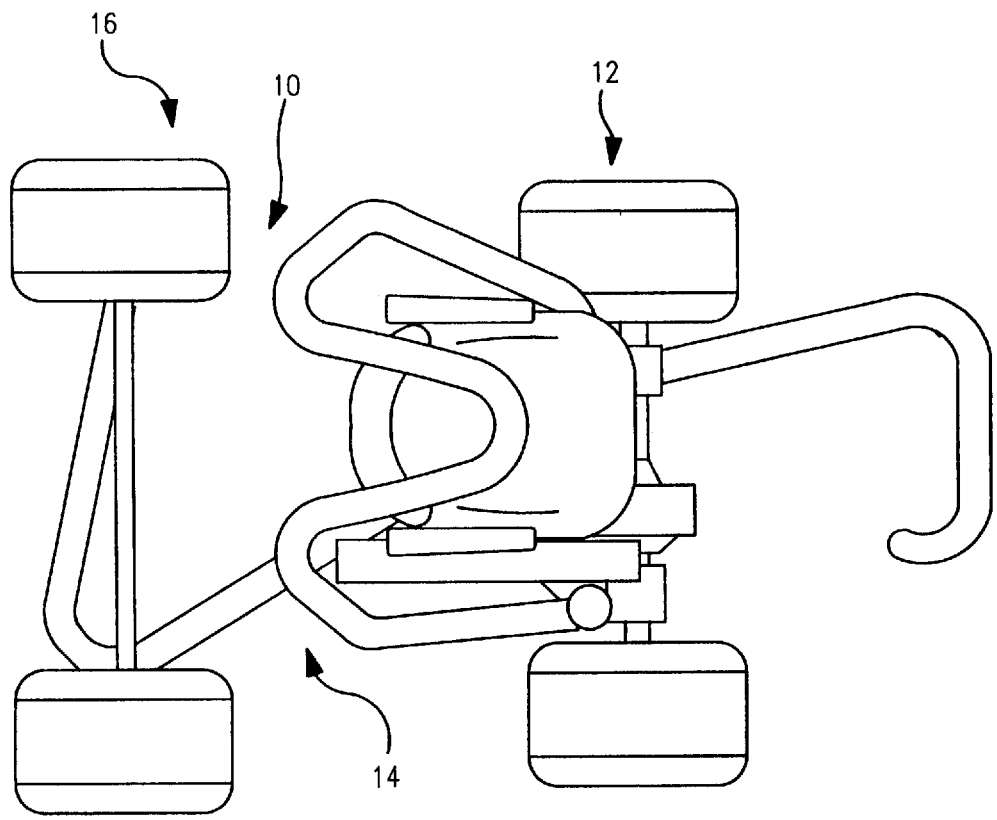

FIGS. 28 and 29 illustrate in side elevation and plan views, respectively, an alternative configuration of the mobile apparatus of the present invention. As shown in FIG. 28, the operator may be positioned in the forward unit 12 and the power sources located in the trailer unit 16 with an articulated joint 14 between the units. In this form of the apparatus, the tower cup cutting element 54 is supported on a support post 50 on the forward unit in position to be accessible to the operator. The deployment mechanisms may be similar to those shown with respect to FIG. 1 with the objective that the cup cutting operations can be performed in clear vision of the operator. The groomer mechanism 18 can be supported on the trailer unit with similar control elements. FIG. 29 shows the top of the apparatus of FIG. 28 without the operator seat, the tower mechanism, the trailer chassis and the groomer elements. The position of the elements of the present invention is not to be limited to the placements shown in FIG. 1 or FIG. 28 as any suitable placement that will permit the apparatus to be easily transportable around a golf course or similar turf area where the described operations of the apparatus can be performed is contemplated in the present invention.

While certain preferred embodiments of the present invention have been specifically disclosed, it should be understood that the invention is not limited thereto as many variations will be readily apparent to those skilled in the art and the invention is to be given the broadest possible interpertation within the terms of the following claims.

I claim:

1. A mobile apparatus for golf course maintenance comprising:

A) a forward unit including at least one independently movable support wheel,

B) a trailer unit including at least one independently movable support wheel,

C) an articulated joint between said forward unit and trailer unit,

D) movably supported golf course maintenance equipment on said trailer unit,

E) a single control means for controlling movement of said support wheels and for positioning and operating said golf course maintenance equipment, said control means including a) means for permitting only rolling movement of said support wheels with respect to a golf course surface to prevent damage to said surface by said wheels and b) means for controlling said articulated joint for limiting relative rotary movement of said forward unit with respect to said trailer unit, F) and said trailer unit including an operator support means, said support means positioning an operator
   a) in visual alignment with said the wheels of said forward unit and said trailer unit and
   b) in position to operate said control means for positioning and operating said golf course maintenance equipment.

2. The mobile apparatus of claim 1 wherein said trailer unit is adapted to support golf course maintenance equipment in the form of putting cup cutting means for cutting a hole in said golf course surface for insertion of a putting cup, said cup cutting means having a stored position and an operating position, said cup cutting means including
   a) a tower unit, means supporting said tower unit at a joint adapted to permit said tower unit to be aligned vertically with respect to horizontal without regard to the position of said trailer unit or said golf course surface, powered means for driving a cup cutting apparatus in said tower unit into said golf course surface and powered means for rotating said cup cutting apparatus while being driven into said golf course surface, means for withdrawing a core from said golf course surface with withdrawal of said cup cutting apparatus and means for replacing said core into a hole cut into a golf course surface,
   b) and means on said trailer unit for securing said tower unit to said trailer unit in said stored position while said mobile apparatus is moved about said golf course.

3. The mobile apparatus of claim 2 wherein said tower unit when in position for cutting a hole in said golf course surface is positioned between said forward unit and said trailer unit in visual position with respect to said operator support means and in alignment with the path of forward movement of said wheel of said trailer unit upon completion of a cup cutting operation.

4. The mobile apparatus of claim 1 wherein said trailer unit is adapted to support an injection means for injecting coagulating materials into said golf course subsurface in and around the location of a position for cutting a hole in said golf course surface, said injection means having a stored position and an operating position, said injection means being supported in manually movable alignment with respect to said operator support means, said injection means including means for penetrating said golf course surface to at least the depth of cutting of said cup cutting means and means for injecting a coagulating material into said golf course subsurface, said coagulating material causing said subsurface material to partially consolidate so as to permit removal of a core and to firm the face of a hole cut with said cup cutting apparatus.

5. The mobile apparatus of claim 4 wherein said trailer unit is adapted to support a golf course hazard maintenance means, said maintenance means having a stored position and an operating position, said maintenance means including raking means for disturbing the hazard materials to an adjustable depth and brooming means for smoothing the surface of said hazard as said mobile apparatus is transported through said hazard, said maintenance means being flexibly supported on a rigid member and being flexible so as to follow the contour of said hazard surface, and means for raising and lowering said hazard maintance means with respect to said trailer unit.

6. The mobile apparatus of claim 2 including operator controlled control means at said operator support means for selectively controlling:
   a) forward, backward and turning movement of said movable support wheels of said forward and said trailer units,
   b) raising, lowering and rotary movement of said cup cutting means,
   c) operating said injection means,
   d) and raising and lowering of said hazard maintenance means,
   e) said control means including means for automatically aligning said movable support wheels for forward movement when said control means is released, and means for preventing movement of said mobile apparatus when said tower unit or said injection means is away from its stored position.

7. The apparatus of claim 6 wherein said operator control means includes a joystick and a control center for controlling said apparatus and feedback means between said joystick and said control center to prevent said joystick from directing conflicting operations in said mobile apparatus.

8. The mobile apparatus of claim 1 wherein said forward unit includes self contained powering means for said mobile apparatus.

9. The mobile apparatus of claim 8 wherein said powering means is a plurality of electrical storage batteries.

10. The mobile apparatus of claim 1 with the addition of operator protecting screening means for protecting said operator from objects when operating said apparatus.

11. The mobile apparatus of claim 1 with the addition of illuminating means mounted on said apparatus for directing light in the path of the apparatus and in the operating areas of said cup cutting means, said injection means and said hazard maintenance means.

12. The mobile apparatus of claim 1 wherein said means for controlling said articulated joint is a magnetic sensing means.

13. The mobile apparatus of claim 1 wherein said support wheels are relatively low pressure generally smooth surfaced tires having a relatively large area of contact with said golf course surface to distribute the weight of said mobile apparatus over a relatively large area of said golf course surface.

14. The mobile apparatus of claim 1 wherein said movably supported maintenance equipment is apparatus for grooming a golf course.

15. The mobile apparatus of claim 14 wherein said movable supported equipment is an apparatus for grooming a hazard.

16. The mobile apparatus of claim 14 wherein said movable supported equipment is an apparatus for rolling a surface of a golf course.

17. The mobile apparatus of claim 14 wherein said movable supported equipment includes a flexible element that is adapted to follow the contour of the golf course surface being groomed.

18. The mobile apparatus of claim 17 including a brush mounted to said flexible element.

19. The mobile apparatus of claim 17 including adjustable extensions attached to and extending through said flexible element.

20. The mobile apparatus of claim 17 including a rigid support bar adjustably attached to said mobile apparatus and a flexible attachment of said flexible element to said rigid support bar.

21. The mobile apparatus of claim 20 including a means for supporting said flexible element in a position to prevent contact of said flexible element to said golf course surface while said mobile apparatus is being moved between grooming operations.

22. The mobile apparatus of claim 20 wherein an interlock mechanism is provided with said adjustable attachment of said rigid support bar to said mobile apparatus to prevent said support bar from being moved into a position to contact said golf course surface as said mobile apparatus is being moved between grooming operations.

23. A mobile apparatus for golf course maintenance comprising:
   A) a forward unit including a set of powered support wheels for said forward unit and a differential gear connection between said support wheels for permitting independent rolling movement of each of said wheels,
   B) a trailer unit including a set of powered support wheels for said trailer unit and a differential gear connection between said support wheels for permitting independent rolling movement of each of said wheels,
   C) and an articulated joint connecting said forward unit and said trailer unit, a powered driving means for moving said forward and trailer units with respect to each other at said articulated joint, movement of said articulated joint causing powered movement of said support wheels in rolling motion to align said forward unit and said trailer unit in accord with the movement at said articulated joint,
   D) golf course maintenance equipment supported on said trailer unit, said maintenance equipment including equipment from the group consisting of at least:
      a) a putting cup cutting means,
      b) an auxiliary means for injecting coagulant material into the golf course subsurface adjacent to said trailer unit,
      c) a hazard maintenance means,
      d) a putting green roller,
      e) a damaged sod replacement cutter,
   E) power source means supported in said forward unit and means connecting said power source means to means for powering said support wheels, said articulated joint, and said maintenance equipment,
   F) control means for controlling, positioning and powering said cup cutting means, said auxiliary means and said hazard maintenance means, and for powering said support wheels,
      a) said control means including means for independently powering said support wheels of said forward unit,
      b) sensing means at said articulated joint for determining the relative positions of said forward unit and said trailer unit,
      c) a single operating means for either powering of said support wheels or said cup cutting means, said auxiliary means or said hazard maintenance means,
   G) an operator accommodation means in visual alignment with all of said support wheels and said maintenance equipment and in manual access position for releasing and positioning said maintenance equipment,
   H) and locking storing means for each of said maintenance equipment means on said trailer unit for securing said maintenance equipment when said mobile apparatus is transported around said golf course, said locking storing means being connected to said control means so as to prohibit movement of said mobile apparatus when any of said maintenance equipment, excepting said hazard maintenance means and said putting green roller, is away from its stored position.

24. A mobile apparatus for golf course maintenance comprising:
   A) a set of powered driving wheels,
   B) a support frame on said driving wheels,
   C) a utility trailer with at least one support wheel,
   D) means for supporting utility equipment on said support trailer,
   E) an articulated joint between said support frame of said driving wheels and said utility trailer,
   F) a tower assembly and tower assembly support means for movably positioning said tower assembly on said support frame,
   G) said tower assembly including
      a) a platten adapted to engage a golf course surface,
      b) a cylindrical cutting cup assembly,
      c) a powered means for rotating said cutting cup,
      d) and means for moving said cutting cup vertically with respect to said platten and said golf course surface,
   H) a ball and socked support in said tower assembly support means, the weight of said tower assembly being below said ball and socket support,
   I) said ball and socket support being adapted to lockably position said tower assembly in a vertical plumb alignment with respect to horizontal,
   J) and said platten having means for releasably fixing said platten to said golf course surface and a central cut-out portion through said platten and aligned with said cutting cup.

25. The mobile apparatus of claim 24 wherein said utility trailer includes sand trap maintenance apparatus movably supported in and on said utility trailer.

26. The mobile apparatus of claim 24 wherein said tower assembly includes:
   a) a powered motor for raising and lowering said cutting cup assembly,
   b) gauging means for limiting vertical movement of said cutting cup,
   c) an ejector rod within said cup cutting assembly,
   d) means for producing relative movement between said ejector rod and said cutting cup,
   e) and a platten door adapted to be positioned under said cutting cup in alignment with said central cut-out portion when said cutting cup is vertically withdrawn from said platten.

27. The mobile apparatus of claim 26 including a roller assembly supported adjacent to said platten, said roller assembly adapted to rollably engage said golf course surface after said cutting cup and platten have been removed from contact with said golf course surface, said roller rollably engaging said golf course surface as said mobile apparatus is moved performing said golf course maintenance.

28. The mobile apparatus of claim 24 with an operator seat on said support frame.

29. The mobile apparatus of claim 24 with steering means on said support frame and means for steering said powered driving wheels with said steering means.

30. The mobile apparatus of claim 24 including control means on said support frame for controlling direction and speed of rotation of said powered driving wheels.

31. The mobile apparatus of claim 24 including power source means supported in said utility trailer and means controllably connecting said power source to said driving wheels, said tower assembly and said sand trap maintenance apparatus.

32. The mobile apparatus of claim 24 wherein said ball and socket support in said tower includes a locking mechanism to fix said tower assembly in a vertical plumb position with respect to the horizontal.

33. An injection means for injecting coagulating materials into a golf course subsurface in and around the location of a position for cutting a putting cup into said golf course surface,
   a) said injection means including means for penetrating said golf course surface to at least the depth of cutting of a cup cutting means,
   b) and means for injecting a coagulating material into said golf course subsurface, said coagulating material causing said subsurface material to partially conglomerate so as to permit removal of a core and to firm the face of a hole cut with said cup cutting apparatus,
   c) and means for moving said injection means into and out of said golf course subsurface for injection of said coagulant material.

34. A cup cutter assembly having a top and a bottom and adapted for cutting a golf course putting cup including removal and replacement of a core from a golf course subsurface comprising:
   a) a universally movable support ball at the top of said assembly,
   b) a platten at the bottom of said assembly and adapted to engage a golf course surface,
   c) said platten having means for releasably fixing said platten to said golf course surface,
   d) a central cut-out portion through said platten,
   e) a cylindrical cutting cup assembly between said top and said bottom of said assembly,
   f) said cutting cup being aligned with said central cut-out portion through said platten,
   g) powered means for rotating said cutting cup,
   h) means for moving said cutting cup vertically with respect to said platten and said golf course surface,
   i) and a cover plate adapted to be movable from a position below said cutting cup and above said platten to a position adjacent to said cutting cup and said platten in response to vertical movement of said cutting cup.

35. A method of locating, cutting and filling a golf course putting hole in a golf course putting surface with a powered mobile apparatus adapted to support an operator, a tower assembly for positioning and operating hole cutting apparatus, and means for controlling movement and direction of said mobile apparatus, comprising the steps of:
   a) positioning said mobile apparatus on said putting surface in the vicinity of the desired position for a putting hole,
   b) moving said tower assembly with respect to said mobile apparatus to position said assembly above the desired position for said putting hole,
   c) supporting said tower assembly from a ball and socket support to cause said tower assembly to become vertically plumb with respect to horizontal,
   d) lowering a platten surface with a central cut-out portion into secure contact with said putting surface,
   e) lowering and rotating a cup cutting cylinder through said platten and into said putting surface to cut a cylindrical core in said putting surface,
   f) raising said cup cutting cylinder to remove said cylindrical core from said putting surface and above said platten,
   g) placing a platten door under said cup cutting cylinder and above said platten,
   h) moving said mobile apparatus to the location of a previously used putting hole,
   i) removing the flag stick and putting cup from said previously used putting hole,
   j) positioning said tower assembly to position said assembly above the position of said previously used putting hole,
   k) placing said platten in engagement with said putting surface,
   l) moving said platten door from below said cutting cylinder,
   m) lowering and rotating said cup cutting cylinder with said cylindrical core into said previously used putting hole,
   n) raising said cup cutting cylinder while retaining said cylindrical core in said previously used putting hole,
   o) raising said platten and said tower assembly from said putting surface and positioning said tower assembly in locked position on said mobile apparatus,
   p) moving said mobile apparatus from said putting surface while rolling a portion of said mobile apparatus over said inserted cylindrical core and over said newly cut putting hole to smooth the edges of said putting hole with respect to said putting surface.

36. The method of claim 35 wherein steps m) and n) are performed as the first steps in the method after removing the putting cup and flag stick from a previously used putting hole on a putting surface, said putting cup is placed into the newly cut putting hole, and said newly cut cylindrical core is carried with said mobile apparatus to the next putting surface for insertion into a previously used putting hole on that next putting surface.

* * * * *